United States Patent [19]

Davis et al.

[11] Patent Number: 5,583,922
[45] Date of Patent: Dec. 10, 1996

[54] TELECOMMUNICATION SYSTEM FOR AUTOMATIC SWITCHING BETWEEN VOICE AND VISUAL DATA COMMUNICATIONS USING FORMS

[75] Inventors: Richard A. Davis; Anthony J. Brittain, both of Boulder; Richard A. Smith, Lafayette, all of Colo.

[73] Assignee: Radish Communication Systems, Inc., Boulder, Colo.

[21] Appl. No.: 417,201

[22] Filed: Apr. 5, 1995

Related U.S. Application Data

[63] Continuation-in-part of Ser. No. 380,064, Jan. 30, 1995, which is a continuation-in-part of Ser. No. 271,850, Jul. 7, 1994, which is a continuation-in-part of Ser. No. 877,328, May 1, 1992, Pat. No. 5,365,577, which is a continuation-in-part of Ser. No. 589,203, Sep. 27, 1990, Pat. No. 5,164,982.

[51] Int. Cl.$^6$ .................................................. H04M 11/00
[52] U.S. Cl. ............................. 379/96; 379/97; 379/207
[58] Field of Search .............................. 379/90, 91, 93, 379/96–98, 100, 201, 207; 375/222; 348/14, 15, 17, 18

[56] References Cited

U.S. PATENT DOCUMENTS

| | | |
|---|---|---|
| Re. 34,429 | 11/1993 | Baran et al. . |
| 4,387,271 | 6/1983 | Artom . |
| 4,656,654 | 4/1987 | Dumas . |
| 4,682,957 | 7/1987 | Young . |
| 4,715,059 | 12/1987 | Cooper-Hart et al. . |
| 4,815,121 | 3/1989 | Yoshida . |
| 4,918,722 | 4/1990 | Duehren et al. . |
| 4,932,047 | 6/1990 | Emmons et al. . |
| 5,040,208 | 8/1991 | Jolissaint . |
| 5,164,981 | 11/1992 | Mitchell et al. . |
| 5,164,982 | 11/1992 | Davis . |
| 5,243,643 | 9/1993 | Satter et al. . |
| 5,255,305 | 10/1993 | Sattar . |
| 5,276,732 | 1/1994 | Stent et al. . |
| 5,283,731 | 2/1994 | Lalonde et al. . |
| 5,291,546 | 3/1994 | Giler et al. . |

OTHER PUBLICATIONS

"intel Proshare Video System" advertisement, *ABA Journal* (page 17, Feb. 1995).

*Primary Examiner*—Wing F. Chan
*Attorney, Agent, or Firm*—Dorr, Carson, Sloan & Birney, P.C.

[57] ABSTRACT

A telecommunication system provides voice and data communications over a conventional telephone line between a server station and a client station using visual forms. The client station includes a processor, display, telephone, and data circuit-terminating equipment (DCE) for data communications. The server station includes a processor, DCE, and either a telephone or a voice card for audio communications. Each DCE includes a modem, a start signal generator for transmitting a start signal over the telephone line prior to transmission of data by the modem, a start signal detector, and a switch that automatically switches the DCE from voice mode to data mode while data is being communicated. The client processor also includes a definition of a visual form having a number of controls with predetermined properties, including properties defining permissible actions that can be taken with respect to each control and instructions to be executed in response to specified actions. The client employs a mouse, keyboard, or the like to select a control in the visual form and to perform an action on the selected control. At least some of the controls include a property directing the client processor to switch the DCE to data mode, transmit data identifying the action, and then return to voice mode. The server processor is programmed to execute steps in response to the actions received from said client station. The visual forms at both stations can be linked so that they are automatically updated to reflect actions at the other station.

35 Claims, 16 Drawing Sheets

Fig. 10

| First Tone Period | | | Second Tone Period | | | Data Mode |
|---|---|---|---|---|---|---|
| 2312.5 Hz | 1412 Hz | 811 Hz | 2912.5 Hz | 2130 Hz | 628 Hz | |
| o | o | o | x | x | x | Not Used |
| – | – | – | x | x | x | Not Used |
| x | x | x | o | o | o | Not Used |
| x | x | x | – | – | – | Not Used |
| o | o | – | – | o | o | VoiceView V.21 300 bps |
| o | – | o | – | o | o | VoiceView V.27ter 4800 bps |
| o | – | – | – | o | o | VoiceView V.29 9600 bps |
| o | o | – | o | – | o | Voice view V.29 4800 bps |
| o | – | o | o | – | o | VoiceView V.17 7200 bps |
| o | – | – | o | – | o | VoiceView V.17 9600 bps |
| o | o | – | o | o | – | VoiceView V.17 12000 bps |
| o | – | o | o | o | – | VoiceView V.17 14400 bps |
| – | o | o | o | o | – | Custom |
| – | o | o | – | o | o | Modem |
| – | o | o | – | o | – | Facsimile |

*Fig. 20*

| Octet 1 Bits | 6 | 5 | 4 | 3 | 2 | 1 |
|---|---|---|---|---|---|---|
| *Capability Type* | | | | | | |
| Modem Data Mode | 0 | 0 | 0 | 0 | 0 | 1 |
| Facsimile Data Mode | 0 | 0 | 0 | 0 | 1 | 0 |
| VoiceView Data Mode | 0 | 0 | 0 | 1 | 0 | 0 |
| ADSI Server (data transmitter using Bell 202 modulation) | 0 | 0 | 1 | 0 | 0 | 0 |
| ADSI CPE (data receiver using Bell 202 modulation) | 0 | 0 | 1 | 0 | 0 | 1 |
| Proprietary | 1 | 1 | 1 | 1 | 1 | 1 |

TELECOMMUNICATION SYSTEM FOR AUTOMATIC SWITCHING BETWEEN VOICE AND VISUAL DATA COMMUNICATIONS USING FORMS

RELATED APPLICATION

The present application is a continuation-in-part of co-pending U.S. patent application Ser. No. 08/380,064, filed Jan. 30, 1995, entitled "Telecommunication System for Automatic Switching Between Voice and Visual Data Communications Using a Voice Response Unit (VRU)", which is a continuation-in-part of pending U.S. patent application Ser. No. 08/271,850, filed Jul. 7, 1994, which is a continuation-in-part of U.S. Ser. No. 877,328, filed May 1, 1992, U.S. Pat. No. 5,365,577, issued on Nov. 15, 1994, which is a continuation-in-part of U.S. Ser. No. 589,203, filed Sep. 27, 1990, U.S. Pat. No. 5,164,982, issued on Nov. 17, 1992.

BACKGROUND OF THE INVENTION

1. Field of the Invention

The present invention relates generally to the field of telephony. More specifically, the present invention discloses a telecommunication system for voice and data communications over a single conventional telephone line using visual forms.

2. Statement of the Problem

The present invention is intended to address the general problem of communicating both voice and data over a single conventional telephone line between a server station and a client station. It is often desirable to be able to transmit data over a single telephone line interspersed with verbal discussions between the parties. This data can be conveyed as a visual form relevant to the conversation. For example, a customer may wish to review airlines schedules and fares, and then make a reservation for a desired flight. A travel agent might wish to show a telephone customer a travel itinerary as they discuss it. An investor may wish to obtain market quotations, or place an order to buy or sell securities. A broker might want to show a customer a visual confirmation of a financial transaction. Each of these types of transactions can be facilitated by providing both the server station and client station with a shared visual form that is automatically updated to reflect actions taken at either station. These visual forms are populated with predefined controls or objects (e.g., data fields, push buttons, option lists, bitmap images, text fields, etc.) to provide a user-friendly interface and to simplify creation of forms.

Voice/Data Telecommunications—Prior Art. One embodiment of the present invention allows visual forms to be shared between a server station and a client station having live operators. A number of telephone systems have been invented in the past to allow transmission of both voice and data over a single telephone line, including the following:

| Inventor | Patent No. | Issue Date |
| --- | --- | --- |
| Davis | 5,164,982 | Nov. 17, 1992 |
| Emmons et al. | 4,932,047 | June 5, 1990 |
| Yoshida | 4,815,121 | Mar. 21, 1989 |
| Cooper-Hart et al. | 4,715,059 | Dec. 22, 1987 |
| Young | 4,682,957 | July 28, 1987 |
| Dumas | 4,656,654 | April 7, 1987 |
| Artom | 4,387,271 | June 7, 1983 |

"Intel ProShare Video System" advertisement, ABA Journal (page 17, Feb. 1995)

Davis discloses a telecommunication display system for accommodating both voice and data over a single telephone line. The receiving party is provided with a display terminal 14 that is connected to the telephone line 22, 52 between the telephone network 50 and the base of the users telephone 12 as shown in FIG. 1 of U.S. Pat. No. 5,164,982. The display terminal includes a voice/data selector that can automatically recognize digital data and switches from voice communication to data communication modes. This patent discusses one embodiment of the VoiceView™ products marketed by Radish Communications Systems, Inc. of Boulder, Colo.

Emmons et al. disclose an example of a conversational video phone. The device communicates both audio signals and freeze-frame video images over a standard telephone line.

Yoshida discloses a telephone communication system that recognizes speech and automatically switches from data to speech transmission.

Cooper-Hart et al. disclose a conversational freeze-frame video phone that has been marketed by Luma Telecom, inc. under the name "Luma." This system includes a camera for periodically capturing an image that is converted into digital data and transmitted over the telephone line to a remote unit in a single short burst. Audio transmission is interrupted upon detection of a video signal being transmitted.

Young discloses a system for teleconferencing and teaching. Supporting material (e.g., slides) for the presentation are prepared in advance and sent from the originating location to a number of remote locations prior to the presentation. The audio portion of the presentation is transmitted by standard telephone service from the originating location to the remote locations. The telephone line also carries control signals from the originating location to control presentation of the supporting materials at each remote location.

Dumas discloses a teleconferencing system that supports both audio and graphic communications. Each user has a personal computer (PC) with a smart modem that monitors the telephone line for a predetermined set of identification codes indicating that graphics are about to be sent by another conference participant.

Artom discloses another example of a telephone system for combining voice and data communications over a single telephone line.

The advertisement for the Intel ProShare video system describes a telecommunications system for voice and video communications over an ISDN line, local area network (LAN), or two analog telephone lines. One application for the ProShare system allows users to review and revise a common document that appears on each user's computer screen. It is believed that the ProShare system was first introduced around January, 1994.

However, none of the prior art provide a protocol for exchanging data using visual forms within the context of combined voice and data communications over a single conventional telephone line. Such visual forms offer a number of substantial advantages in terms of: (1) simplifying and standardizing the interface for data communications between stations; (2) increasing system performance by limiting the amount of data that must be transmitted to the fields that have been the subject of an action at either station; (3) providing a means for specifying rules for data entry and validation, and (4) providing an architecture whereby system control and intelligence can be relegated to a remote station. The present invention also allows visual forms to be used in a number of settings. For example, the present system allows operators at remote stations to simultaneously view the same visual form (or at least visual forms with some fields in common). Actions at either station are automatically transmitted to the other station and used to update its copy of the visual form.

Voice Response Units—Prior Art. Another implementation of the present invention employs a modified voice response unit (VRU) as the server station to provide both voice and data communications over a telephone line using visual forms. For example, this embodiment is especially well suited for processing orders for goods or services, and providing information from databases (e.g., airlines schedules, fares and reservations, billing questions, bank account information, or brokerage transactions).

Conventional VRUs have been used for many years to provide an automated system for voice and audio communications with callers. In a typical conventional implementation, the VRU transmits prerecorded voice messages to present the caller with a number of options. The caller selects one of the options by pressing a corresponding key on the caller's telephone key pad. The VRU then transmits voice messages that contain information requested by the caller, such as bank account balances, airline flight schedules, etc. Most conventional VRUs are limited to communication of voice and audio tones generated by the telephone key pad (e.g., DTMF tones). Therefore, most conventional VRUs are inherently limited in their ability to communicate data with the caller and have no ability to share screens of visual data with the caller.

One family of VRU components widely used in the industry is manufactured by Dialogic Corporation of 300 Littleton Road, Parsippany, N.J. 07054. Dialogic VRU components can be combined to create VRU systems in a wide variety of configurations. One commonly used configuration employs a processor to control a network interface card and a number of voice cards, similar to the VRU 35 depicted in FIG. 2. The network interface card 27 handles a number of incoming telephone calls over a T1 carrier or a number of analog telephone lines. Each voice card 28 generates voice messages from prerecorded data and provides detection and A/D conversion of incoming voice signals. The VRU system components can communicate digital voice data with one another by means of a PCM expansion bus (PEB) 29. An additional ISA or equivalent bus 33 is included to enable the processor 20 to communicate with the VRU system components as well as other computer components, such as hard disk drives and serial ports using a conventional bus architecture similar to that found in most personal computer systems. The processor controls the sequence of operation of the entire VRU from a preprogrammed script. For example, the script may cause the processor to direct one of the voice cards to transmit a series of verbal messages that provides the caller with a list of options (e.g., "Press one if you have billing questions. Press two for a new service request. Press three if you have a natural gas leak.", etc. ) The caller selects one of the options by pressing the corresponding key on the telephone key pad, which transmits an audio signal to the VRU. The VRU voice card detects the audio signal and the processor follows the script for the selected option. Instructions are issued by the processor to the network interface card and voice cards over the ISA bus using a predefined command protocol. Digitized voice data can also be communicated over the PEB bus from the voice cards to the network interface card or other system components.

A number of other voice processing systems, interactive voice response (IVR) systems, and automated systems for transmitting data in response to telephone calls have been invented in the past, including the following:

| Inventor | Patent No. | Issue Date |
| --- | --- | --- |
| Giler et al. | 5,291,546 | Mar. 1, 1994 |
| Lalonde et al. | 5,283,731 | Feb. 1, 1994 |
| Stent et al. | 5,276,732 | Jan. 4, 1994 |
| Baran et al. | Reissue 34,429 | Nov. 2, 1993 |
| Sattar | 5,255,305 | Oct. 19, 1993 |
| Sattar et al. | 5,243,643 | Sep. 7, 1993 |
| Mitchell et al. | 5,164,981 | Nov. 17, 1992 |
| Jolissaint | 5,040,208 | Aug. 13, 1991 |
| Duehren et al. | 4,918,722 | Apr. 17, 1990 |

Giler et al. disclose a fax message system in which action information is stored for each fax at a fax receiving station. In one embodiment, the sending party provides routing information for the fax that is stored by the fax receiving station.

Lalonde et al. disclose a computer system for creating a database of classified ads. The system can be accessed by means of an interactive voice response system that converts text from the database into a voice message.

Baran et al. disclose an interactive facsimile system that allows an unmodified fax machine to interactively select and retrieve facsimile pages from a database on a fax server. The remote user marks a paper selector sheet form using a pencil or pen. The selector sheet is then transmitted by the remote fax machine to the fax server.

The patents to Sattar and Sattar et al. disclose a voice processing system (e.g., for voice mail) that can be configured to allow different caller interfaces for each caller.

Mitchell et al. disclose a voice response system for providing interactive data exchange between a caller, an operator, and one or more databases. A voice path switch initially connects the caller to a database through a voice response unit that provides digitized voice prompts and questions to the caller. The caller responds by entering numbers on the telephone key pad. The voice response unit then converts data from the database to voice signals recognizable by the caller. The voice response unit or the caller may selectively transfer the transaction to a human operator. The system also provides the operator with a list of information transacted thus far between the caller and the voice response unit.

Stent et al. disclose another example of a database retrieval system having a voice response unit 26 that prompts the caller to make selections by means of DTMF signals. The system also allows the call to be switched to a human operator.

Jolissaint discloses a coordinated voice and data display system having the capability of suspending a telephone call in anticipation of resuming the call at a time in the future. The system includes a number of telephones 18 managed by a computerized branch exchange (CBX) 14 and a number of display terminals 16 managed by a host processor 12. If the system becomes congested with incoming calls, the caller may be offered the option of leaving a call-back message with the system. In one embodiment, a VRU is used to prompt the caller to provide information (e.g., the caller's telephone number and a call-back time) by means of DTMF keys that is stored and subsequently used in the call-back procedure.

Duehren et al. disclose a system in which the delivery of electronic information (e.g., fax or binary data) is controlled by DTMF commands sent by the user using the telephone key pad.

3. Solution to the Problem

None of the prior art references uncovered in the search show a telecommunications system that supports both voice and data communications using a protocol for exchanging visual forms. In one embodiment, this enables operators at two remote stations to view and discuss a common visual form. Any actions taken with respect to the visual form are automatically transmitted to the other station so that both copies of the visual form remain synchronized. In another embodiment, a modified VRU is used as the server station. The subscriber station displays a visual form that provides an interface for data communications with the VRU.

SUMMARY OF THE INVENTION

This invention provides a telecommunication system for voice and data communications over a conventional telephone line between a server station and a client station using visual forms. The client station includes a processor, display, telephone, and data circuit-terminating equipment (DCE) for data communications. The server station includes a processor, DCE, and either a telephone or a voice card for audio communications. Each DCE includes a modem, a start signal generator for transmitting a start signal over the telephone line prior to transmission of data by the modem, a start signal detector, and a switch that automatically switches the DCE from voice mode to data mode while data is being communicated. The client processor also includes a definition of a visual form having a number of controls with predetermined properties, including properties defining permissible actions that can be taken with respect to each control and instructions to be executed in response to specified actions. The client employs a mouse, keyboard, or the like to select a control in the visual form and to perform an action on the selected control (e.g., press a button, select an option from a list, or enter data in a field). At least some of the controls include a property directing the client processor to switch the DCE to data mode, transmit data identifying the action, and then return to voice mode. The server processor is programmed to execute steps in response to the actions received from said client station. For example, the server station can be a voice response unit (VRU) used to process orders or provide account information in response to actions on the client station's form. Alternatively, the server station can display a visual form having at least some controls in common with the client's visual form that are automatically updated to reflect changes to the client's visual form. The visual forms at both stations can be linked so that they are automatically updated to reflect actions at the other station.

Accordingly, a general object of the present invention is to provide a telecommunications system capable of voice and data communications between two stations using visual forms.

Another object of the present invention is to provide a telecommunications system that enables an automated server station, such as a VRU, to provide interactive voice and data communications with a client station.

Yet another object of the present invention is to provide a communications system that enables two-way voice and data communications between two stations, so that each station's visual form will automatically be updated to reflect actions taken at the other station.

BRIEF DESCRIPTION OF THE DRAWINGS

The present invention can be more readily understood in conjunction with the accompanying drawings, in which:

FIG. 10 is a table of the different data modes for each combination of first and second tones shown in FIG. 9.

FIG. 20 is a table of the codings for the "capability type identifier" field in the capability elements shown in FIGS. 19a through 19d.

DETAILED DESCRIPTION OF THE INVENTION

Figure 1:
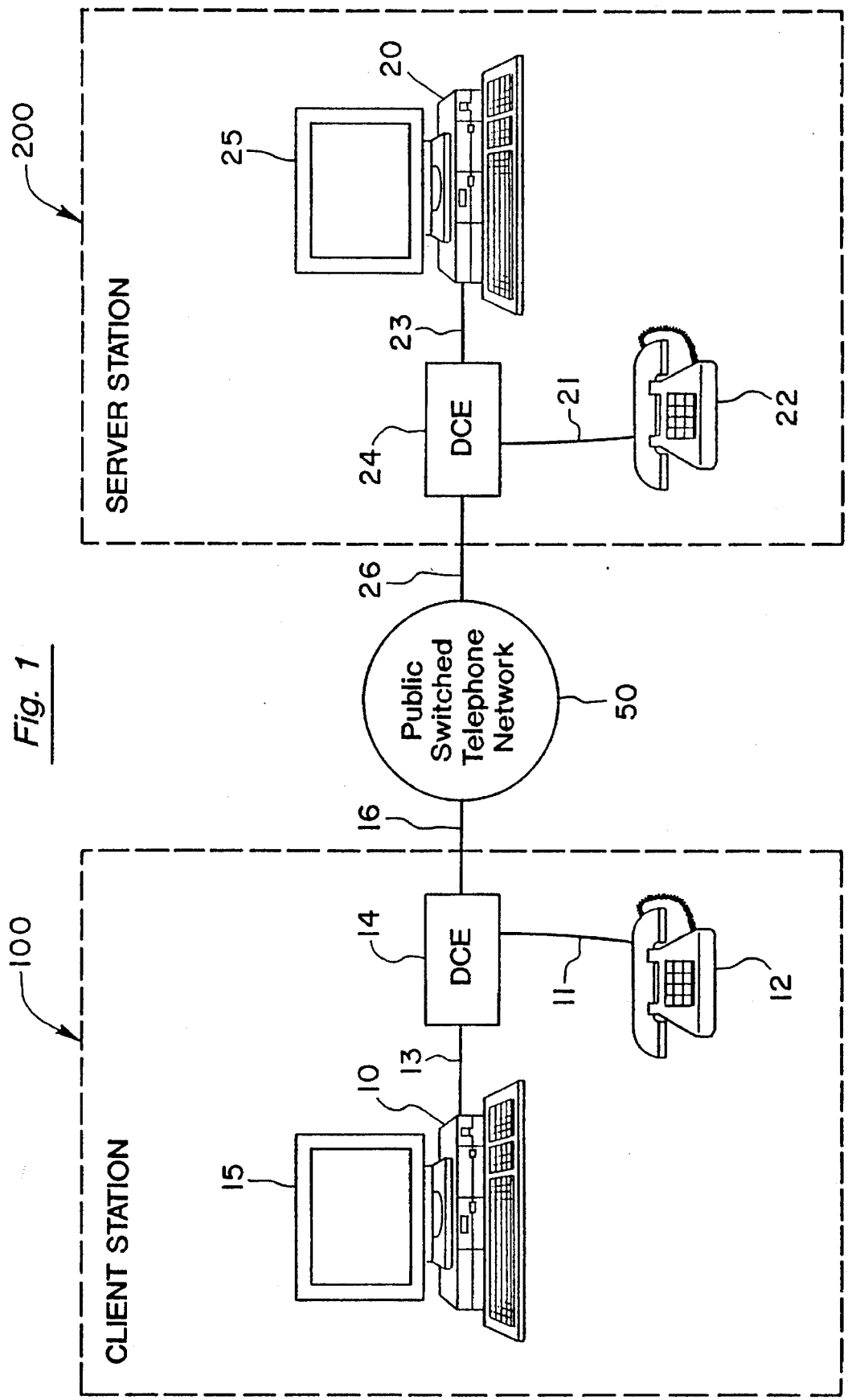
FIG. 1 is a schematic block diagram of the present system showing communication over a telephone network between a client station 100 and a server station 200.

Overview. Turning to FIG. 1, a schematic block diagram is provided showing two stations 100, 200 communicating over a telephone line 16, 26 via the public switched telephone network 50. Each station includes a conventional telephone set 12, 22 for voice communications. Data circuit-terminating equipment (DCE) 14, 24 is inserted between the telephone 12, 22 and the telephone network 50 to selectively couple the telephones 12, 22 for voice communications, and to selectively provide data communications in any of a variety of data formats, protocols, and/or transmission rates. Each DCE 14, 24 is also tied to data terminal equipment (DTE) 10, 20, such as a personal computer for data communications. An RS-232 interface 13, 23 can be employed to connect the DCE 14, 24 to a serial port of the DTE computer system 10, 20. Alternatively, the DCE can be built in and attached via the internal bus of the DTE.

The present system can be employed, for example, by telemarketers, travel agencies, brokerage houses, financial institutions, or any other field of use where there is a need to share visual data during a telephone conversation. Such a telephone call is typically predominated by voice communications using the telephones 12 and 22. However, at desired times during the conversation, either party can momentarily interrupt the telephone conversation and transmit data over the telephone line to the remote station where it can be viewed and stored by the other party. For example, the server station 200 may include a database of products for sale, financial records, or airline schedule information that the user at the client station 100 wishes to see.

The telecommunication linkage is established in voice mode in the conventional manner by one party dialing the telephone number of the other party. The party at the server station 200 accesses the database and generates a display screen 25 containing the requested data. This can be accomplished using a DTE 20, such as a personal computer having a computer processor, a display screen 25, and a keyboard. At an appropriate time during the conversation, the party at the server station 200 activates a data transmission command (e.g., by pressing a predetermined key combination on the computer keyboard, or by clicking a mouse on a predetermined icon on the computer display screen 25). The DTE processor 20 directs the DCE 24 to disconnect its telephone 22 and to transmit a start signal over the telephone line requesting that the client station's DCE 14 switch to data mode. This start signal also indicates the format and transmission rate (the "mode") in which the data will be transmitted. Upon receipt of the start signal, the client station's DCE 14 automatically disconnects its telephone 12 to temporarily suspend voice communications and configures itself to receive data in the specified mode. The data is then downloaded by the server station DTE 20 to its DCE 24, which modulates and transmits the data over the telephone line to the remote DCE 14. The client station's DTE 10 uploads the received data from its DCE 14 and displays the data on its screen 15 for the client to view. Both stations automatically return to voice mode after the data has been transferred.

Data can also be transmitted in the opposite direction by the client station 100 using the same procedure for bidirectional communications. This creates the possibility of handling other aspects of the dialog by exchanging visual forms between the client station DCE 14 and the server station DCE 24. For example, the list of menu options can be transmitted to the client station 100 as a visual form having either a list of numbered options, a menu bar with pop-up submenus, or a series of icons or buttons. The client can then navigate through the menu options using either the computer keyboard or mouse to select a desired option. Data indicating the selected option is transmitted by the client DCE 14 to the server DCE 24, which in turn forwards the data to the server processor 20.

A visual form can be populated with any combination of controls or objects (e.g., static text, bitmap graphics, fields for data entry, push buttons, menus, list boxes, check boxes, radio buttons, and combo boxes) commonly found in graphical user interfaces such as Microsoft Windows™ (Microsoft Corporation, Redmond, Wash.). Each visual form is transmitted between stations as a data file containing general form information together with definitions of each control contained in the form. For example, a control definition includes a number of properties, such as the control type, size and placement within the form, default value, and permissible actions that can be taken with respect to the control. The control properties can define rules for validating input data, and instructions to be executed when the user enters or exits the control. In the case of a data field, the control definition might instruct the client station to transmit the value entered by the user in the field to the server station. In the case of a button, the control definition would typically instruct the client station to transmit a predetermined action code to the server station if the button is pressed by the client. Forms can also be linked together to produce multi-screen forms. Subforms can also be included within forms. This visual form interface provides almost unlimited flexibility in defining the appearance and functionality of screens transmitted between stations.

Synchronizing Visual Forms Between Stations. Although the present invention has application to a wide range of fields of use, two distinct embodiments are primarily envisioned. The first embodiment is illustrated in FIG. 1. Here, both stations 100, 200 have live operators and include telephones 12, 22 for voice communications and displays 15, 25 for displaying visual forms. Both stations display visual forms that have at least some controls in common. For example, the entire visual form may be identical for both stations, or one station may display a visual form containing a subset of the controls from the visual form displayed by the other station. In this configuration, each station is directed by the control properties to transmit data to the other station reflecting any actions taken with respect to the common controls. Similarly, each station automatically updates its visual form to reflect actions received from the other station. Thus, the visual forms of both stations are synchronized.

The telephone call is typically begun in voice mode in the conventional manner by either the client or the server dialing the telephone number of the other party to establish a telephone connection 11, 16, 26, and 21 through the public switched telephone network 50. The server station 200 may initially transmit visual forms to the client station 100 over the telephone line as data files, or visual forms may have been previously stored on disk or CD-ROM at the client station. The server station 200 may initially direct the client station 100 to open a designated visual form. However, the client station may initially open a visual form on its own as an automated means for establishing a telephone connection with the server station. In either case, a corresponding form is opened by the server processor and displayed on the server's display screen. The client can navigate within the visual form using conventional input means, such as the computer keyboard, mouse, trackball, or cursor keys, to select and act on controls within the visual form. For example, in the case of a data field, the client can activate the control by moving the mouse cursor into the field and then clicking. The client then enters data into the field via the keyboard. Similarly, push buttons, radio buttons, check boxes, menus, or list boxes can be activated by clicking the mouse on a selected button or option. Some controls, such as bitmap images or text are visible but cannot be acted upon by the client. The permissible actions that can be taken with respect to any control depend on the predefined properties associated that control.

The properties associated with each control may also define instructions or procedures to be executed by the processor when the control is activated, changed, or exited by the client. For example, these procedures can be used for data validation or to change the status of other controls within the visual form. These procedures can also be employed to cause the client station to temporarily switch to data mode, transmit data identifying the action, and return to voice mode. The data is received by the server DCE 24 and forwarded to the server processor 20 which updates the controls displayed in the server's visual form to reflect the client's action. In the preferred embodiment, this data is transmitted by the client station as a special type of visual form that contains a command instructing the server station to merge (or substitute) the data into the servers visual form.

The preceding discussion has demonstrated one-way communication of data from the client station 100 to the server station 200. This may be adequate for some applications, but it should be expressly understood that the present system provides bidirectional data communications. For example, the operator of the server station may take actions with regard to the server's visual form. The procedure outlined above for updating the server's visual form to reflect actions by the client station applies in the opposite direction. The operator at the server station can navigate within the visual form to select and act upon a control, depending on the permissible actions associated with the properties for each control. The control properties can also cause the server station to temporarily switch to data mode, transmit data identifying the action, and return to voice mode. This data is received by the client DCE 14 and forwarded to the client processor 10 which updates the controls displayed in the client's visual form to reflect the server's action. Alternatively, instead of immediately returning to voice mode after transmitting data, the control properties can direct the server station to stay in data mode for additional data transfer in either direction.

Figure 2:
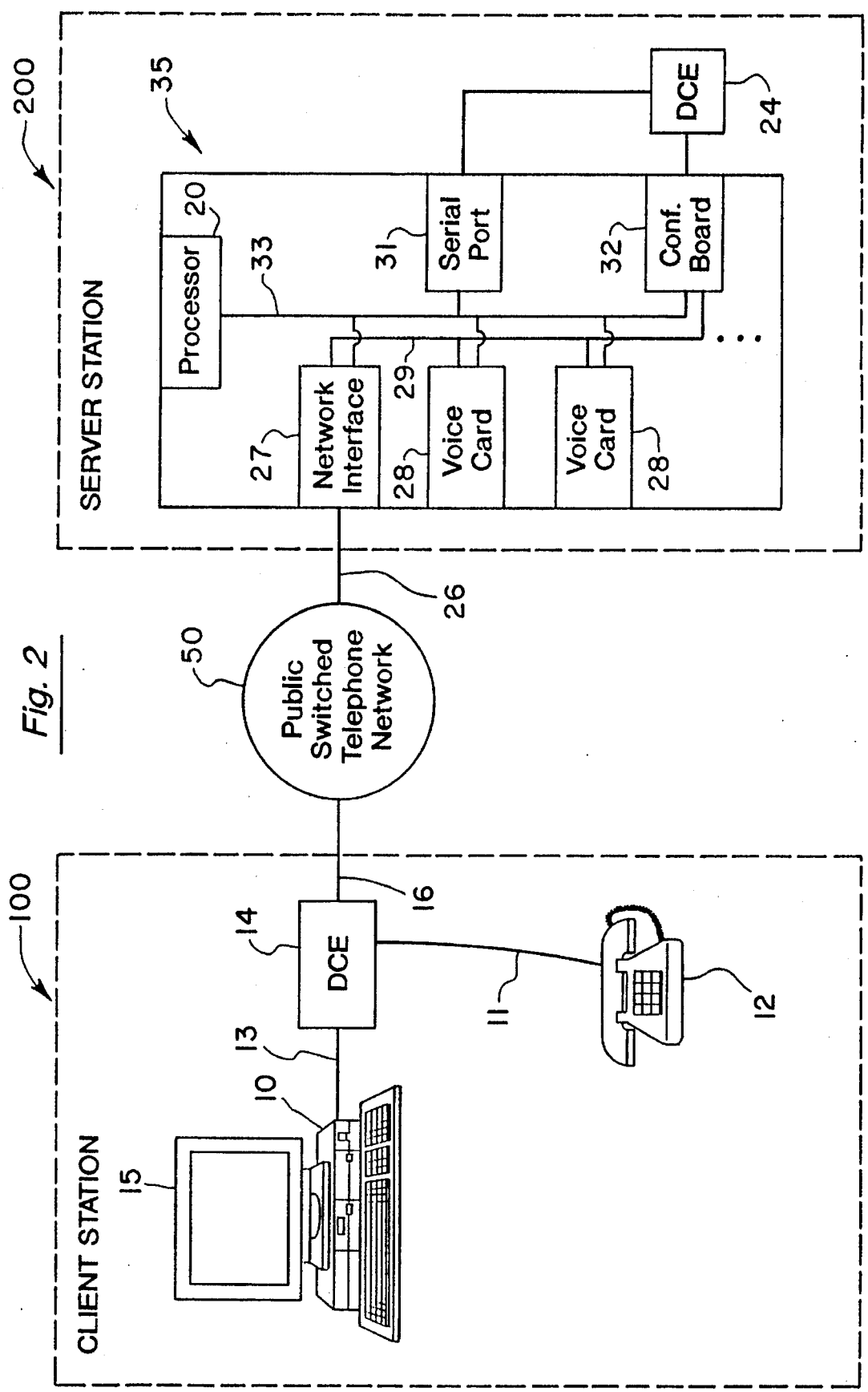
FIG. 2 is a schematic block diagram of an alternative embodiment of the present system showing communication between a client station 100 and a server station 200 employing a voice response unit 35.

Voice Response Unit (VRU). FIG. 2 shows a schematic block diagram of a second embodiment using an automated server station 200 based on a modified voice response unit (VRU) 35. The configuration of the client station 100 remains the same as in FIG. 1.

The VRU 35 can have any of a number of possible configurations. The embodiment depicted in FIG. 2 is generally based on the Dialogic VRU architecture previously discussed. The VRU processor 20 controls and communicates with the remaining system components using an ISA or EISA bus 33 for control and data communications, and a PEB bus 29 for communication of digital voice data. The network interface card 27 handles communications over the telephone line 26. In particular, the network interface card 27 follows the appropriate telephone communications protocol to manage a number of telephone calls routed through the public switched telephone network 50. For example, the network interface card 27 is capable of answering incoming telephone calls and dialing outgoing calls. The network interface card 27 also operates under control of the VRU processor 20 to provide a two-way interface for voice and data signals between the telephone line 26 and the VRU's PEB bus 29. In the embodiment shown in FIG. 2, a number of voice cards 28 are inserted on the PEB bus 29. Each voice card 28 operates under the control of the VRU processor 20 to transmit recorded voice messages. The voice card 28 can also provide voice and signal detection features, including detection of audio tones received from the client's telephone key pad. The ISA data bus 33 is used by the processor 20 to control and communicate with other peripheral devices (e.g., a disk drive or serial port) using a protocol similar to that found in most personal computer systems. In the embodiment shown in FIG. 2, the data bus 33 supports a conventional serial port 31 that allows the VRU processor 20 to communicate with external devices. Here, a second DCE 24 is connected to the serial port 31 by means of a conventional RS-232 connection. The VRU processor 20 communicates with its DCE 24 over the ISA bus 33 and the serial port 31 using a protocol for commands and data exchange that is substantially identical to that employed by the client station, as will be described below in greater detail. A conferencing board 32 serves to interface the telephone line of the DCE 24 with the PEB bus 29 so that visual data output by the DCE 24 is routed to the appropriate existing telephone conversation.

The VRU processor 20 serves as the DTE for the DCE 24 connected to the VRU 35. Thus, the overall system shown in FIG. 2 provides two-way communications between the DCEs 14 and 24, each of which is controlled by a corresponding DTE 10 and 20, respectively. The telecommunication linkage is initially established in voice mode in the conventional manner by either the client or the VRU dialing the telephone number of the other party to establish a telephone connection 11, 16, and 26 through the public switched telephone network 50. For an incoming telephone call from a client station to the VRU 35, the network interface card 27 detects the incoming call and notifies the VRU processor 20. The processor 20 then follows a pre-programmed script to interact with the client station 100. For example, this script may first direct the DCE 24 to transmit a visual form containing a set of controls (e.g., a set of push buttons) that present the client with options using the protocol discussed at length below. These controls are then displayed on the client display screen 15.

For example, the client selects the desired option by clicking on the corresponding button with the mouse. The properties associated with these controls direct the client station to temporarily enter data mode after one of the controls has been activated by the client, transmit data over the telephone line to the server station identifying the action, and then return the client station to voice mode. The data is received by the VRU DCE 24 and forwarded to the VRU processor 20 which proceeds to the next step in the script based on the option selected by the client. For example, the VRU 35 may direct the client station to open a second visual form having controls (e.g., fields for data entry) that ask the client to enter his account number, social security number, or similar information. The client responds by entering the required information in these fields via the client's keyboard. The properties associated with these controls direct the client station 100 to temporarily enter data mode and transmit the data entered by the client into these fields to the VRU 35. Again, the data is received by the VRU DCE 24 and forwarded to the VRU processor 20. In response, for example, the VRU processor 20 communicates through the serial port with its DCE 24 to download requested information as a third visual form, and directs the DCE 24 to transmit this data via the conferencing board 32, PEB bus 29, and network interface card 27 to the client station 100 over the existing telephone connection. The client station DCE 14 receives the visual form and forwards it to the client station DTE 10 so that the it can be displayed on the client station's display screen 15. Both sides of the conversation automatically return to voice mode after the visual form has been transferred to the client station. The VRU processor 20 continues with its script, which may provide for further voice communications with the client station, lists of menu options for selection by the client, or additional visual forms.

In voice mode, the VRU processor 20 directs one of the voice cards 28 to generate recorded voice or audio messages that are carried over the PEB bus 29 and through the network interface card 27 to the telephone line 26. Any return voice messages can be processed by the voice card 28 and stored by the VRU 35 in the conventional manner. Similarly, any audio tones generated by the client telephone key pad are detected by the voice card 28 in the conventional manner. In data mode, the VRU processor 20 directs the DCE 24 to generate and transmit visual data through the conferencing board 32, PEB bus 29, and network interface card 27 to the telephone line 26. Any return data from the client station follows the reverse route to the VRU DCE 24 where it is received and forwarded to the VRU processor 20.

It should also be expressly understood that a number of alternative VRU configurations are possible. For example, the network interface card 27, voice cards 28, and DCE 24 can interface to a common PEB bus 29 controlled by the VRU processor 20. This eliminates the need to connect an external DCE through a serial port.

Another alternative embodiment uses a server station with a plurality of DCE's and incoming telephone lines. One server DCE is dedicated to each incoming telephone line. Each server DCE is controlled by the VRU processor 20 through the ISA bus and a serial port as in the embodiment depicted in FIG. 2. When a server DCE operates in voice mode, it connects the client station through to the voice card while continuing to monitor the telephone line for the data mode start sequence. In data mode, the server DCE disconnects itself from the voice card and communicates with the client DCE.

Another alternative embodiment employs a PBX or other telephone switching means controlled by the VRU to dynamically link one of several DCEs to each telephone conversation as needed. In this case, the PBX rather than the VRU serves to conference a selected DCE to the appropriate existing telephone conversation.

Figure 3:
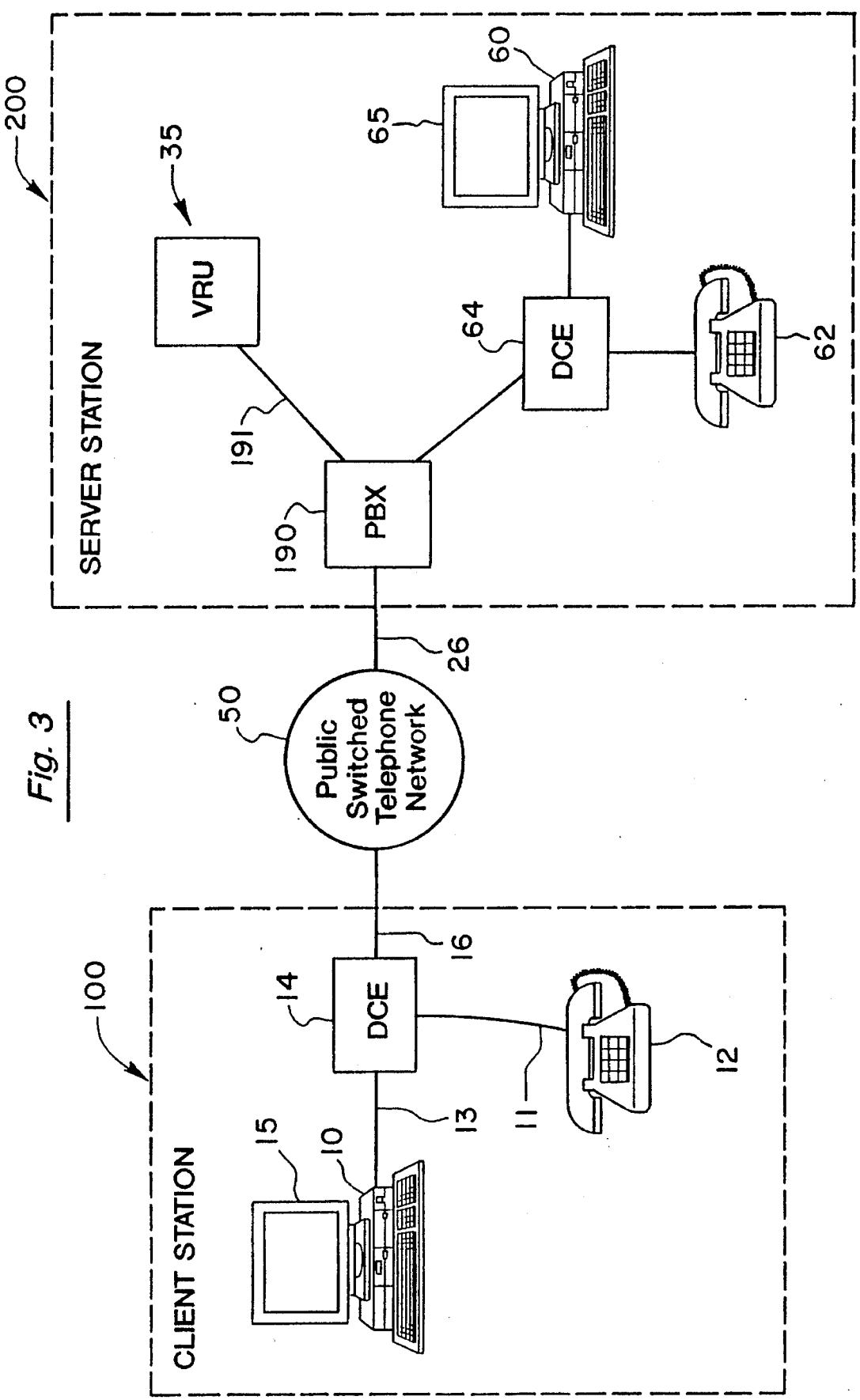
FIG. 3 is a schematic block diagram of an alternative embodiment of FIG. 2 in which a PBX 190 is employed to switch a telephone call from the VRU 35 to a live operator.

FIG. 3 is a schematic block diagram of an alternative embodiment in which a PBX 190 is employed to transfer a telephone call from the VRU 35 to a live operator. The operator station is equipped with a telephone 62, a computer 60 with a display screen 65, and a DCE 64. These components are configured in the same manner as the client station previously discussed, so that the operator computer 60 serves as the DTE for the operator DCE 64. For example, the VRU script may include a menu option that allows the client to elect to be transferred to an operator. If this option is selected, the VRU 35 signals the PBX 190 to temporarily place the telephone call on hold and connect the VRU 35 to the operator station. These commands are issued by means of the appropriate PBX signaling protocol over the telephone line 191 between the VRU 35 and PBX 190 or by means of a separate data link. The VRU 35 can then transfer previous screens or other data concerning the call for the live operator to view by establishing a data mode link between the VRU DCE 24 and the operators DCE 64. After this data has been transferred, the VRU 35 commands the PBX 190 to complete the transfer of the telephone call to the operator station, so that the client and operator directly communicate in either voice or data mode.

This implementation is particularly useful in applications where the client is required to enter initial data before being directed to a live operator. For example, many computer software companies maintain a "help desk" for answering technical questions from customers. Some frequently asked questions can be handled by a VRU without the assistance of a live operator. A VRU can also handle some other types of routine customer matters, such as taking orders for updates or replacement diskettes. The software company may market many different types of software, each of which is supported by different group of help operators. In this case, the VRU can be used to screen and categorize incoming calls and then route calls to the appropriate operator based on the general category of the customer's question. For example, the customer is presented with an initial visual form that asks the client to enter his name, specify the relevant software product, and enter his product registration number. The customer may also be presented with a list of options to assist in categorizing the customer's question. This initial data-gathering process can be taken farther by providing additional, secondary visual forms that prompt the customer to provide more specific information concerning the customer's problem. Based on the information provided by the customer, the VRU transfers the call to an operator having expertise in the appropriate field to answer the customer's questions. The VRU can also transfer the information entered by the customer to the operator's station where it is displayed to assist the operator.

Visual Forms

The preferred implementation of the present invention employs a software engine that is common to both the client processor 10 and server processor 20. The engine drives the station's DCE 14, 24 and provides a well-defined application program interface (API) for applications development. Each engine communicates data and instructions to the remote station's engine by exchanging visual forms. Each form is a single file defining a screen to be displayed, a series of instructions, or both. For example, a form can define a dialog box to be filled out, a dialog box and all of the data to be displayed within the box, an instruction to open and display a previously stored form, or an instruction advising that the user has performed a specified action on a form.

A form consists of a header, a table that defines the elements in the form, and the elements themselves. The header has a unique two byte code at the start that must be present for the form to be recognized as such, a number indicating the version of the form, and the number of elements in the form. The element table serves as a directory for the parts of the form. The element table identifies each element by its data type, gives a pointer into the form to the starting point for the element data, and specifies the length of the element data. The possible elements in a form are:

| | |
|---|---|
| Dialog Box | The Windows dialog box template used to display the form. A form cannot be displayed without a dialog box. |
| Data | This is the data for each control used to populate the form. Data strings are used to define each control, including its properties. These properties can include methods or instructions for data validation, ranges of permissible values for the control, actions to be taken when the control is entered or exited by the user or when data is entered or changed by the user. |
| Billboard Bitmap | A special bitmap used as the billboard for the form A bitmap that is displayed as part of the form (e.g. push buttons or artwork within the dialog box) |
| Name | The name of the form (i.e., an arbitrary ASCII string). |
| Flags | Global flags for the whole form |
| Command | A command or instruction that the form should take. For example, the form can cause another form to be displayed, or can merge data into a currently existing form. These features allow the server to tell the client station to display a previously-stored form on the client's display, or to populate a previously-stored form with arbitrary data. |

A visual form is defined by a form definition file (.FRM file). The form definition file contains an element table with one line for each element of the form. Depending on the type of element, the line either fully describes the element (e.g., for names, flags, or commands) or specifies a file containing the element data (e.g., for dialog boxes, data, billboards, or bitmaps).

The line in the .FRM file for defining the dialog box template should read:

```
dialog=<filename>
``` where <filename> is the full path of a resource file (.RES file) created using AppStudio in the Windows environment. The dialog box can contain any combination of standard Windows controls. However, there must only be one dialog box within any .RES file.

A static control is used to place static information on the screen, such as text or a bitmap image. For example, the following element defines control 57 which displays the phrase "Static Text" on the screen in 20 point green Arial text:

```
~57 = Static Text
^font Arial 20
^color 0 255 0
```

Strings preceded by "^" define display characteristics of the control. The "color" string defines the color of the control in terms of three red, green, and blue values ranging from 0 to 255. Bitmaps are referenced by their element name from the form definition file (e.g., "~124=bitmap7")

The following is an example of a list box control:

```
~27 = First Item
!Selected Item
^font Times New Roman 10
Last Item
```

If a line begins with "!", this line is highlighted in the list box. List boxes may also define actions to be performed when an item in the list is selected (e.g., by double clicking). These are handled and defined in the same ways as push buttons, described below.

Combo boxes are defined in the same manner as list boxes. The item to be placed in the editable area at the top of the combo box is designated with an "!". Combo boxes can also use "*" to designate "all".

Push buttons, radio buttons, and check boxes can also be defined with specific actions associated with each button or box. Push buttons can also be customized with particular bitmaps for the up and down states. For example:

```
~31=^up bitmap5^down bitmap6
```

The following actions can be associated with a control (e.g., when a push button is pressed, or when an item in a list box is double clicked):

| | |
|---|---|
| ^Close | Closes the form so that it is no longer displayed |
| ^chain <filename> | Closes the current form and then opens the specified form <filename> |
| ^dial <#> | Sends a message to the application to dial the telephone number in the specified control |
| ^bitmap <#> | Brings up a dialog box allowing the user to select a new bitmap for the control |
| ^action <#> <parms> | Adds a new action element to the form. |
| ^store <flags> | The form is stored with any changes the user has made. The <flags> dictate which elements from the form are stored |
| ^send <flags> | A message is sent to the application to send the elements of the form specified by <flags> |

The flags dictate which elements of the form are sent or stored. This is a series of bit flags that are or'ed together to create a 32-bit number, as follows:

| | |
|---|---|
| 0x01 | Store dialog |
| 0x02 | Store data |
| 0x04 | Store selected data |
| 0x08 | Store bitmaps |
| 0x10 | Store flags |
| 0x20 | Store name |
| 0x40 | Store billboard |
| 0x80 | Store actions |
| 0xffffffff | Store all parts of the form |

"Storing Data" will store data from all controls in the form. "Storing Selected Data" will not store any controls that still have default data in them, or any elements of a list box that have not been selected by the user.

Examples of Visual Forms

Figure 4:
FIGS. 4 through 6 are examples of visual forms displayed by the client station.
Figure 5:
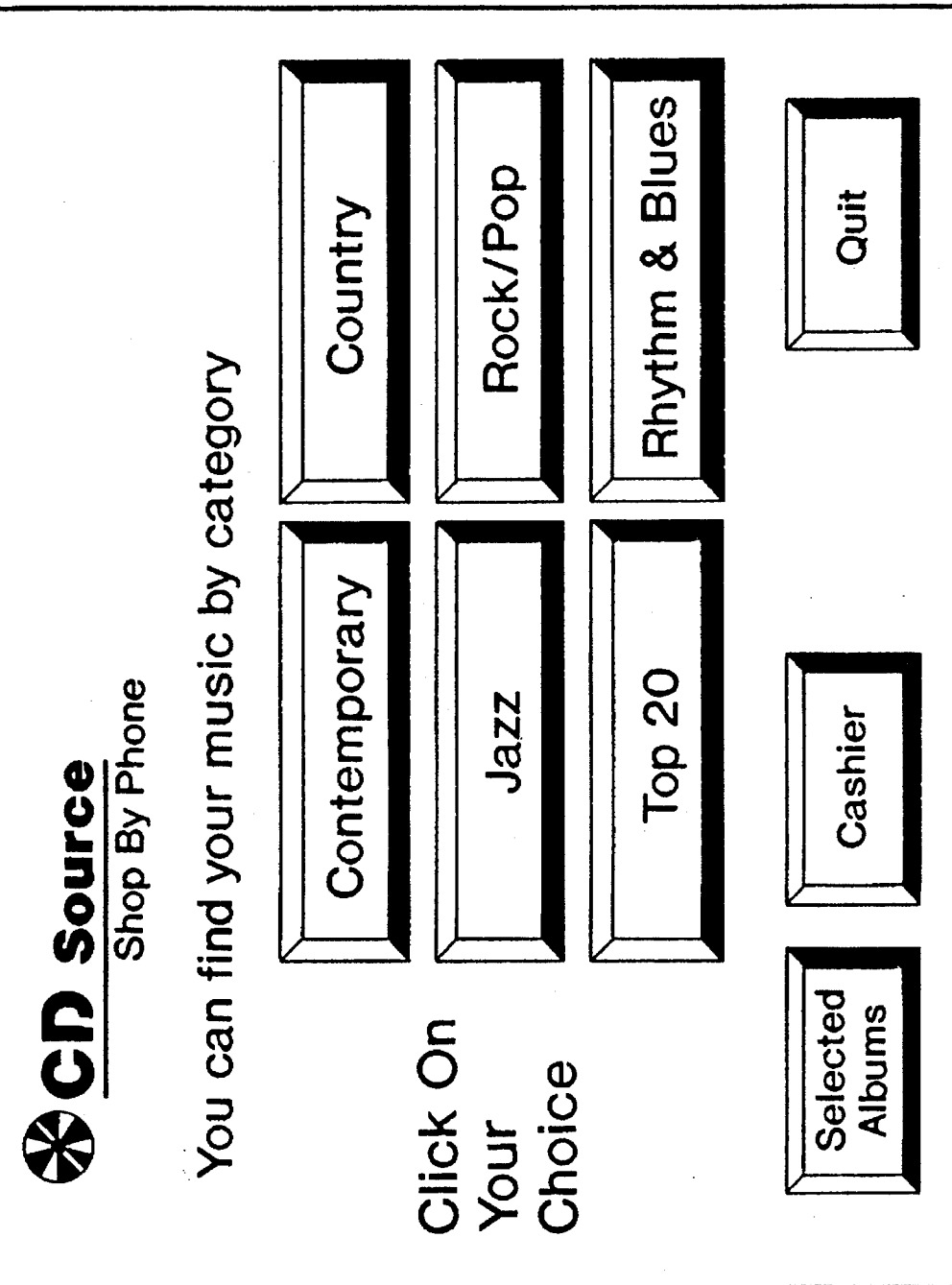
Figure 6:
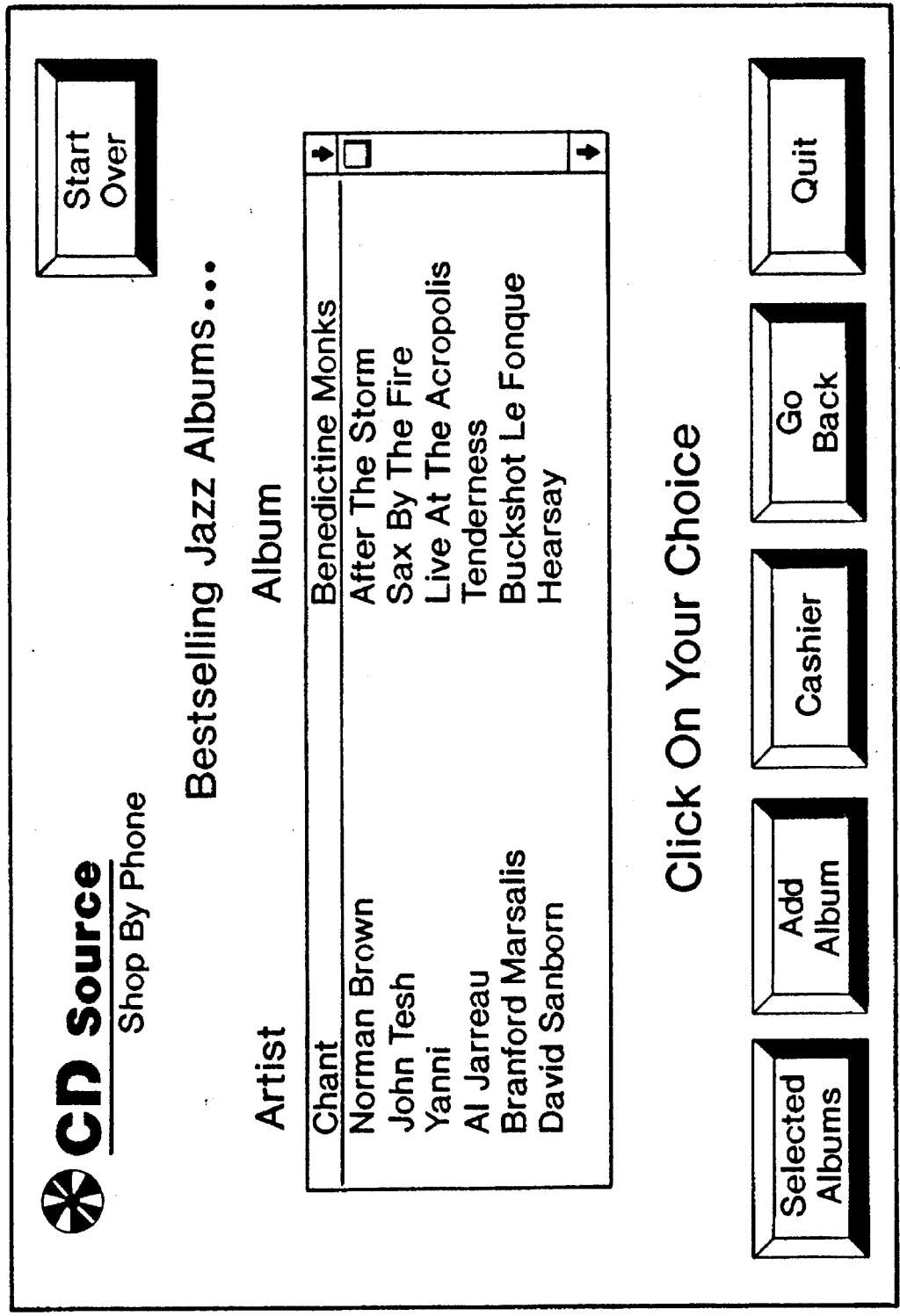

FIGS. 4 through 6 show three examples of visual forms in a "shop at home" system that allows a client to listen to short segments from a library of available CDs and then place an order for selected CDs. FIG. 4 shows the initial visual form that is opened when the client starts the system. The initial visual form would normally have been previously stored on the client's disk and is automatically opened with the application. The form shown in FIG. 4 has the following elements in its form definition file:

| | |
|---|---|
| Dialog | The resource dictating the template for the controls |
| Data | Strings defining the controls in the form and their properties |
| Bitmap | The bitmap "Listen to any CD . . . " |
| Billboard | A bitmap displayed to advertise this service |
| Flags | A flag set to indicate this form should use 3D effects |
| Name | Name for the form, including version number |

The visual form has four numbered controls, as follows:

| | |
|---|---|
| 1. | A frame containing a bitmap image. |
| 2 | The "Dial" button. |
| 3. | The "Cancel" button. |
| 4. | A hidden control containing the telephone number to dial. |

More specifically, the data definition of the visual form looks like this:

| | |
|---|---|
| ~1 = bitmap1 | (display bitmap1 in the frame) |
| ~2 = Dial | (text on the "Dial" button) |
| ^dial 4 | (dial the string in field 4) |
| ^chain category.frm | (then display category form, see FIG. 5) |
| ~3 = Cancel | (text on the "Cancel" button) |
| ^close | (close the form) |
| ~4 = 18005552952 | (hidden phone number, not displayed) |

When the "Cancel" button is pressed, the form is closed and a message is sent to the application layer advising that the form has closed. When the "Dial" button is pressed, the form reads the phone number out of control 4 and sends a message to the application layer asking it to dial the phone number to establish a telephone connection with the server station 200. The form "category.frm" is then opened and displayed, as shown in FIG. 5.

The visual form in FIG. 5 contains the following controls:

| 1. | Frame for the bitmap | |
|---|---|---|
| 2. | Static text | (You can find your music by category . . . ) |
| 3. | Static text | (Click on your choice) |
| 4–9. | The 6 category buttons | (red) |
| 10–12 | The 3 action buttons at the bottom | ("Selected Albums", etc.) |

These controls are defined as follows:

| ~1 = bitmap1 | |
|---|---|
| ~2 = You can find your music . . . | (text) |
| ^font Arial 14 | (font for text) |
| ^color 255 0 0 | (color - red) |
| ~3 = Click on your choice | (text) |
| ^font Arial 16 | (font for text) |
| ~4 = ^up bitmap2 | (use bitmap2 if button 4 is up) |
| ^down bitmap3 | (or bitmap3 if button 4 is down) |
| ^action 5000 | (if pressed, indicates action 5000) |
| ^send .128 | (code to send just actions from form) |
| ~5 = ^up bitmap4 | (use bitmap4 if button 5 is up) |
| ^down bitmap5 | (or bitmap5 if button 5 is down) |
| ^action 5001 | (if pressed, indicates action 5001) |
| ^send 128 | (code to send just actions from form) |

Similar button definitions are used for the remaining controls 6 through 12. When one of the buttons is pressed, the corresponding action code (5000, 5001, etc.) is sent by the client station over the telephone line to the server station. In this type of application, the server station 200 is typically a modified VRU 35 as shown in FIG. 2 that has been programmed to automatically provide voice and data communications over the telephone line in response to action codes received from the client station 100. For example, when the "Jazz" button (control 5) is pressed, an action code of 5001 is transmitted to the VRU 35. In response, the VRU 35 builds a visual form (as shown in FIG. 6) containing a list of available jazz CDs and transmits this visual form to the client station. The visual form transmitted to the client station can either contain the entire definition for the screen or only the album title list. In the latter embodiment, the client station already has a predefined shell for the album list form ("album.frm"). The server transmits a form file containing the album title list as data strings, and a command instructing the client station to merge the album title data into album.frm. The client station opens aibum.frm, merges the data from the album list into album.frm, and displays the resulting visual form as shown in FIG. 6. This form contains the following 12 controls:

| 1. | Frame for CD Source bitmap |
|---|---|
| 2. | Static text (Best Selling Jazz Albums) |
| 3. | Static text (Artist) |
| 4. | Static text (Album) |
| 5. | List box with album titles |
| 6. | Static text (Click on your choice) |
| 7–12 | Six action buttons |

Here again, unique action codes are assigned to each of the push buttons and a unique number is assigned to each album title in the list. This data is transmitted by the client station to the server to reflect any actions taken by the client with respect to the visual form.

The VRU 35 can also direct its voice card 28 to transmit an appropriate voice or music segment as each visual form is displayed by the client station. The VRU 35 can also store representative music segments from each album that are played when the client selects an album from the album list.

Data Circuit-Terminating Equipment (DCE).

1. DCE Overview. The following sections provide additional details concerning one possible implementation of the DCEs 14 and 24, the data mode start sequence, and the protocol used by each DTE 10, 20 to control and communicate with its respective DCE 14, 24. Throughout this discussion, it should be recalled that the VRU processor 20 serves as the DTE for the VRU DCE 24, while the processor 10 of the client computer serves as the DTE for the client DCE 14. Unlike the client station 100, the VRU 35 does not typically include a telephone 12 that must be disconnected while the VRU 35 is in data mode. However, playback of voice is halted and the PEB bus 29 functions to handle connecting and disconnecting of appropriate cards between voice and data modes. In addition, the VRU 35 follows a pre-programmed script, while the client station operates under the client control within the range of options allowed by the VRU script. However, subject to these exceptions, both DCEs 14 and 24 operate in essentially the same manner, and the same type of unit can be employed at both locations.

Figure 7:
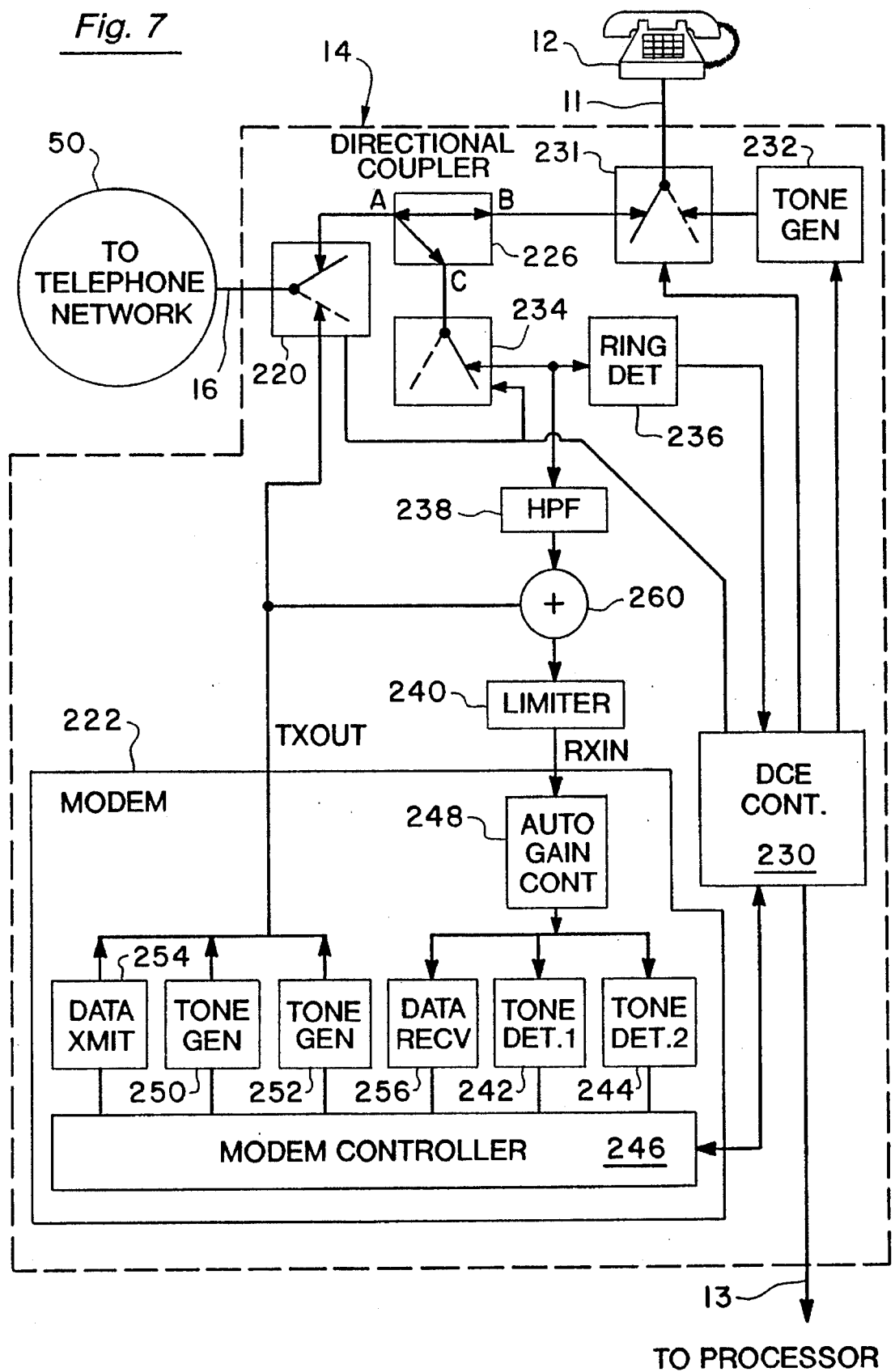
FIG. 7 is a schematic block diagram of the data circuit-terminating equipment (DCE) 14.

FIG. 7 shows the physical layer of the DCE 14, 24 including a telephone line 16 from the telephone network 50 connected to a first relay switch 220. This first relay switch 220 is for connecting and disconnecting the telephone 12 and modem 222 to and from the telephone line in response to control signals from the DCE controller 230. The DCE controller 230 is preferably a microprocessor with associated memory and peripheral circuitry. When the first relay switch 220 is switched to its alternative broken-line position, incoming signals are rerouted via a summing device 260 to the receive-in (RXIN) port of the modem 222.

The telephone 12 is also connected by a line 11, a second relay switch 231, and a directional coupler 226 to the first relay switch 220. The second relay switch 231 also operates in response to a control signal from the DCE controller 230 to connect and disconnect a tone generator to the telephone 12 to provide a pleasing tone or a voice message while the telephone is disconnected during data mode. A third relay switch 234 is provided to connect and disconnect a ring detector 236 from the incoming telephone signal via the directional coupler 226.

The DCE is normally defaulted to voice mode, in which all of the relay switches 220, 231, and 234 are in the solid-line positions shown in FIG. 7 and as described above. The user can call out in the conventional manner by dialing the desired number and ringing out. The directional coupler 226 operates such that signals are transmitted bidirectionally between its contacts A and B (i.e., between the telephone 12 and the telephone network 50). On the other hand, the directional coupler 226 allows only incoming signals at contact A to be transmitted to contact C. At contact C, the ring detector 236, high pass filter 238, and the receive port (RXIN) of the modem 222 are connected to the directional coupler 226. Signals from the telephone 12 on contact B cannot reach contact C in the directional coupler 226, so that signals from the telephone 12 do not reach the modem's tone detectors 242 and 244. The directionality of the directional coupler 226 is not perfect, but it greatly enhances the reliability of start tone detection. The receive path also includes a high pass filter 238 to limit low-frequency noise, and a limiter 240 and an automatic gain control amplifier 248 to maintain the amplitude of the incoming signal within predetermined maximum and minimum limits. The analog telephone signal received by the modem 222 is demodulated by the data receive block 256 to deliver corresponding digital data to the modem's controller 246.

In the preferred embodiment, the data receive block 256 can be configured by the DCE controller 230 and modem controller 246 to selectively operate at any of a number of different data modes (e.g., VoiceView, facsimile, modem file transfer, etc.) and data transmission rates (e.g., V.21 300 bps FSK, V.27ter 4800 bps DPSK, or V.29 9600 bps QAM). The analog signal received by the modem 222 is also monitored by a number of tone detectors 242 and 244 to detect predetermined tones used to signal the start of data transmission and to indicate the data transmission rate and data format. In the preferred embodiment of the present invention, the modem 222 includes two tone detectors adapted to detect a start tone defined by frequencies of 2312.5 Hz and 2912.5 Hz for approximately 200 msec. This start tone is followed by a series of HDLC flags transmitted using the V.21 300 bps (high channel) FSK modulation scheme, which in turn is followed by a mode signal to specify the mode for the data being transferred (e.g., VoiceView, facsimile, modem data transfer, etc.) and the data transmission rate (i.e., 9600, 4800, or 300 bps). In one embodiment, the mode signal is a tone having one or more combinations of frequencies (e.g., 2312.5 Hz, 1412.5 Hz, or 811 Hz). However, in one alternative embodiment, the mode signal is transmitted as data in a V.21 HDLC frame. It should be expressly understood that the DCE 14 shown in FIG. 7 is merely one example of many possible implementations of this device.

In operation, the DCE 14 switches between a voice mode and a data mode. In voice mode, the DCE controller 230 controls the relay switches 220, 234, and 231 to their released positions shown in FIG. 7. This directly couples the telephone 12 to the telephone line 16, thereby providing normal voice communications between the telephones through the telephone network 50. Additionally, the modem 222 transmit port (TXOUT) is disconnected from the telephone line 16 by a first relay switch 220 to prevent any extraneous signals produced by the modem 222 from interfering with voice communications. However, the receive port of the modem 222 remains coupled to the telephone line. This enables the tone detectors 242 and 244 within the modem 222 to continually listen in on the voice communications and detect the presence of start signals indicating that the remote station intends to transmit data.

Data mode can be initiated in either of two situations. The first case occurs when the DTE wishes to transmit data to the remote station. The second case occurs when the modem tone detectors 242 and 244 detect a start signal indicating that the remote station intends to initiate a data mode. In either case, the DCE controller 230 activates the relay switches 220 and 231 to disconnect the telephone 12 from the telephone line 16, and instead couples the modem transmit port (TXOUT) to the telephone line 16.

The present system allows two-way data communications between the server station 200 and the client station 100 using identical DCEs. The server station 200 typically serves as the originating or "transmitting" station for the purpose of data communications, and the client station serves as the "remote" station. However, it should be expressly understood that these roles could be reversed.

In either case, prior to initiating a data mode request to a remote station at the other end of a telephone connection, the transmitting DCE begins in the default voice mode with the switches 220, 231, and 234 released to the positions depicted in FIG. 7. In the case of the client station, the DTE processor 10 determines whether the client has indicated a desire to transmit data (i.e., initiate data mode) by pressing a predetermined key or clicking on a predetermined area of the display screen using a mouse, as provided by the application layer. In the case where the server station 200 is a VRU 35, the script determines when the VRU will transmit data. in either case, the transmitting station's DTE directs its DCE controller 230 to change the positions of the relay switches 220, 231, and 234 to data mode. In addition, the DCE controller 230 directs the modem 222 to establish a data link with the remote station. In particular, the modem controller 246 controls a number of tone generators 250 and 252 to generate start tones to signal the start of data transmission and to indicate the data mode prior to transmitting data to the remote station. After the data link has been successfully established, each data block is forwarded by the transmitting station's DTE through the DCE controller 230 and modem controller 246 to the data transmit block 254, which modulates and transmits a corresponding analog signal to the remote receiving station's DCE over the telephone connection 16, 50, and 26. The remote station can then transmit data in the upstream direction to the originating station, where it is received and demodulated by the data receive block 256 of the originating station's modem 222. This data is passed by the originating station's DCE controller 230 for use by its DTE. After the data session has ended, the originating DCE can return to voice mode by tearing down the data link and releasing the relay switches 220, 231, and 234 to their default positions shown in FIG. 7.

In the embodiment of FIG. 2, the VRU's script is programmed to enable the server station 200 to receive data from the client station 100. The preceding general discussion of two-way data communications also applies to this specific embodiment. The VRU 35 begins again in the default voice mode with the switches 220, 231, and 234 released to the positions depicted in FIG. 7. If the modem 222 detects the start tones followed by the remainder of the start sequence indicating that the client station intends to transmit data, the server DCE 24 notifies its DTE (i.e., the VRU processor or server station processor 20). The server DCE 24 can accept or reject the data mode request based on its current capabilities. Normally, the DCE 24 accepts the data mode request and proceeds to convert to the specified data mode. In particular, the server DCE 24 establishes a data link with the remote client station, and changes the switches to their data mode positions, as previously discussed. After the data link has been established, the client station can transmit its data, which is received and demodulated by the data receive block 256 of the modem 222 within the server DCE 24. This data is passed by the server DCE controller 230 for use by the server station's processor 20. After the data session has ended, the client DTE 10 can return the client DCE 14 to voice mode by tearing down the data link, and releasing the switches to their default positions shown in FIG. 7.

Figure 8:
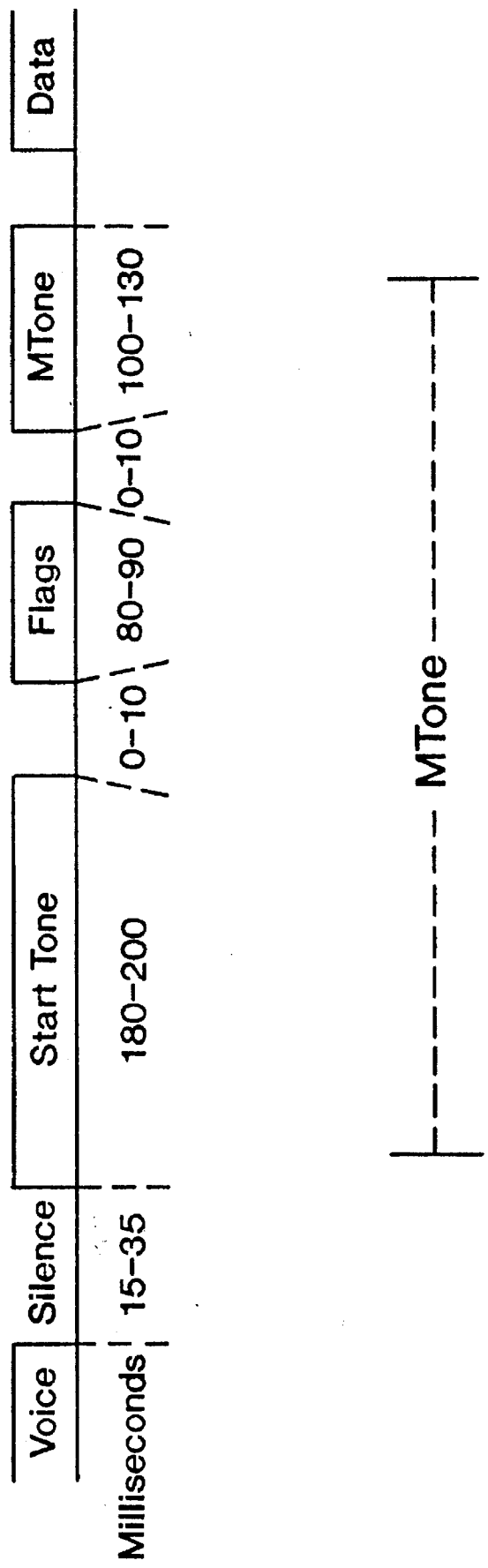
FIG. 8 is a diagram of the signals transmitted by a DCE constituting the data mode start sequence.

2. Data Mode Start Sequence. The data mode start sequence is a collection of tones and modulated carrier that requests the answering DCE to switch from voice mode to data mode and establish a data link, and indicates which data modulation type will be used for the information transfer. FIG. 8 shows the signals that constitute the data mode start sequence. The originating DCE transmits this signal sequence to the answering DCE. The physical layer of the answering DCE switches to data mode when a start tone is detected. The remaining elements of the data mode start sequence are used to further identify that the signal being detected is a valid start sequence and to identify in which data mode to operate (VoiceView, modem, facsimile, etc.). The flag sequence and mode signal perform these two functions, respectively.

The originating DCE begins the sequence by transmitting approximately 25 msec of silence. During this period, the originating DCE switches its local telephone out of the communication path, mutes the voice path to the local telephone, allows the telephone network interface to settle, and configures itself to transmit the data mode start sequence. A start tone having frequencies of 2312.5 Hz and 2912.5 Hz is used to begin the data mode start sequence. These frequencies have been selected because they are in a frequency band where the human voice has relatively low energy and they do not interfere with the commonly used telephony and data communications tones.

"Talk-off" is a phenomenon that can affect the successful detection of the start sequence. Talk-off occurs when the human voice or some other audible sound emulates the start tone and causes the DCE to react as if it had received a valid signal. Avoiding the commonly used tones and frequencies listed above is crucial to achieving acceptable talk-off performance of a DCE. In addition, the HDLC flag sequence following the start tone makes it significantly more difficult to unintentionally simulate the start sequence.

The proper detection of the start sequence can also be impaired by a second phenomenon known as "talk-down." Audible signals (e.g., speech, background noise, coughing, etc.) from the local telephone may be present simultaneously with the reception of a start tone from a remote DCE. The DCE must be able to detect the start tone concurrently with these signals from the local telephone. The directional coupler, discussed above, provides one possible technique for minimizing talk-down.

The start sequence includes a minimum of three complete HDLC flags (01111110) transmitted following the start tone. The flag sequence enables the DCE to better detect the data mode start sequence and avoid talk-off. The transmission of the first bit of the first flag begins at least 10 msec following the end of the start tone. The flags are transmitted using the V.21 300 bps (high channel) FSK modulation scheme. Once the answering DCE detects a single HDLC flag it remains in data mode and monitors for the mode signal to prepare itself for the forthcoming data modulation scheme. If no mode signal is detected after the DCE detects the HDLC flag, data mode terminates and voice mode is re-established.

Figure 9:
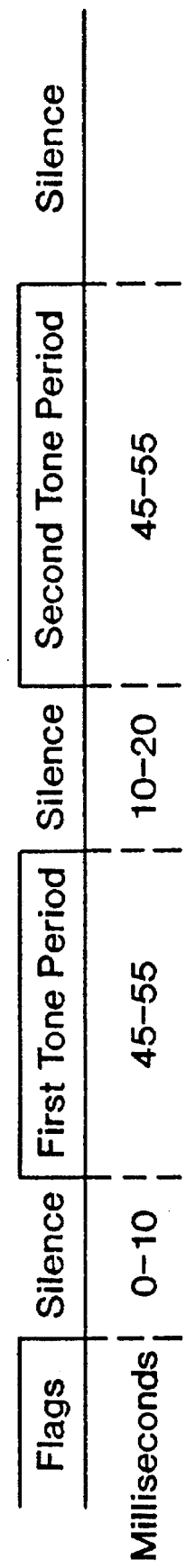
FIG. 9 is a diagram of the mode tone (MTone) portion of the data mode start sequence.

A mode tone (or MTone) is one method used to identify the data mode in which the DCEs will operate. Transmission of the mode tone begins within 10 msec following the last bit of the flag sequence. The mode tone is actually comprised of two periods of tone separated by a short period of silence as shown in FIG. 9. During each tone period, either a single frequency tone or dual frequency tone is present. The first tone period contains a tone comprised of the following three frequencies: 811 Hz, 1412.5 Hz, and 2312.5 Hz; while the second tone period contains a tone comprised of these three frequencies: 2912.5 Hz, 2130 Hz, and 628 Hz. FIG. 10 shows the different combinations of these frequencies for both tone periods and the corresponding data mode for each tone combination.

The (000) combination in a tone period is not used because it indicates no tones present, which results in an unreliable way to communicate between the DCEs. The (111) combination for each tone period is not used in order to eliminate the need to generate three tones simultaneously. The (100001) tone combination defines an escape sequence used to specify custom data modes. This tone will be followed by a custom data mode identifier that contains further information specifying in which information transfer mode the DCEs will run. The custom data mode identifier is an HDLC frame transmitted using V.21 300 bps modulation. The (001100), (010100), and (011100) tone combinations indicate the default VoiceView data mode transmission rates. These tones correspond to the CCITT V.21 300 bps, CCITT V.27ter 4800 bps, and CCITT V.29 9600 bps modulation schemes, respectively. The highest transmission rate is referred to as the Priority rate and is normally used to transmit data between DCEs. The medium speed rate is called the Recovery rate and is used to retransmit data that cannot be successfully transmitted at the Priority rate. The slowest rate is called the Burst rate and is used to send small packets of data, including acknowledgments, between DCEs.

Modulation schemes other than the above-specified defaults may be used in VoiceView data mode for the Priority and Recovery rates. Burst rate should always use V.21 300 bps because of its robustness and lack of a training sequence. As defined in FIG. 10, optional data modulation schemes that may be used during VoiceView data mode include: V.29 4800 bps and V.17 7200 bps, 9600 bps, 12000 bps, and 14400 bps. To ensure that the DCEs on both ends of the call support an optional rate, a two-way exchange of capabilities should be performed using the capabilities query. The transmitting DCE can then send data by using the mode tone corresponding to any common data rate.

The (100100) tone combination indicates the modem data mode of operation. The DCE, when operating in this mode, adheres to established data communications standards for conventional modems. The default mode of operation assumes CCITT V.22bis. However, the data protocol used may be set by the DTE. The (100101) tone combination indicates the facsimile mode of operation. The DCE, when operating in this mode, adheres to the CCITT T.30 standard for facsimile operation.

Figure 11:
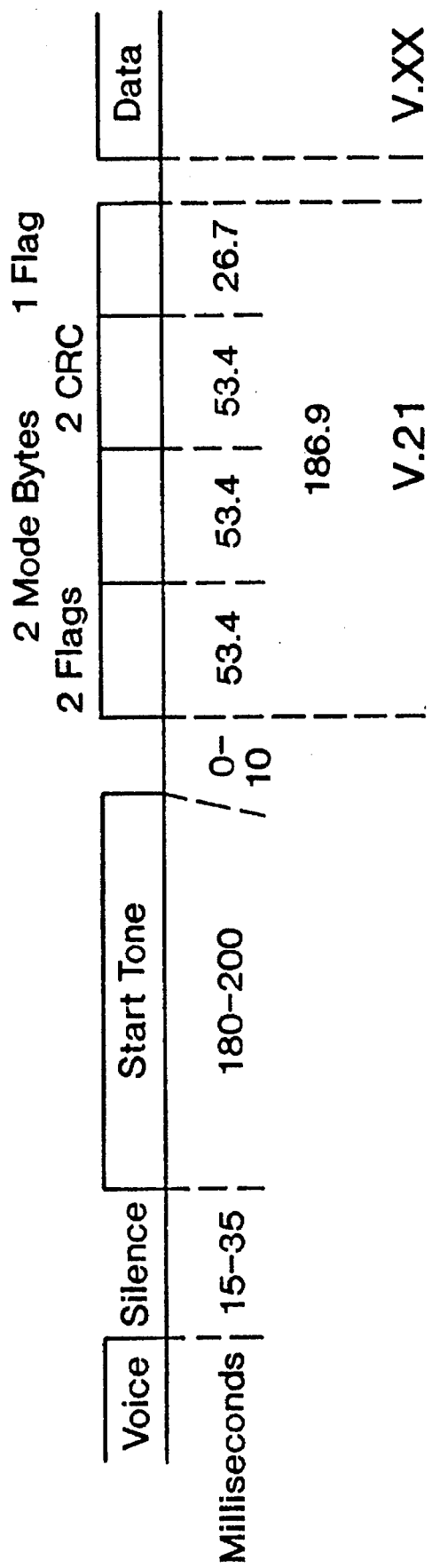
FIG. 11 is a diagram of an alternative embodiment of the data mode start sequence in which the mode tone sequence is replaced with data encoded in a V.21 HDLC frame to identify the data mode.
Figure 12:
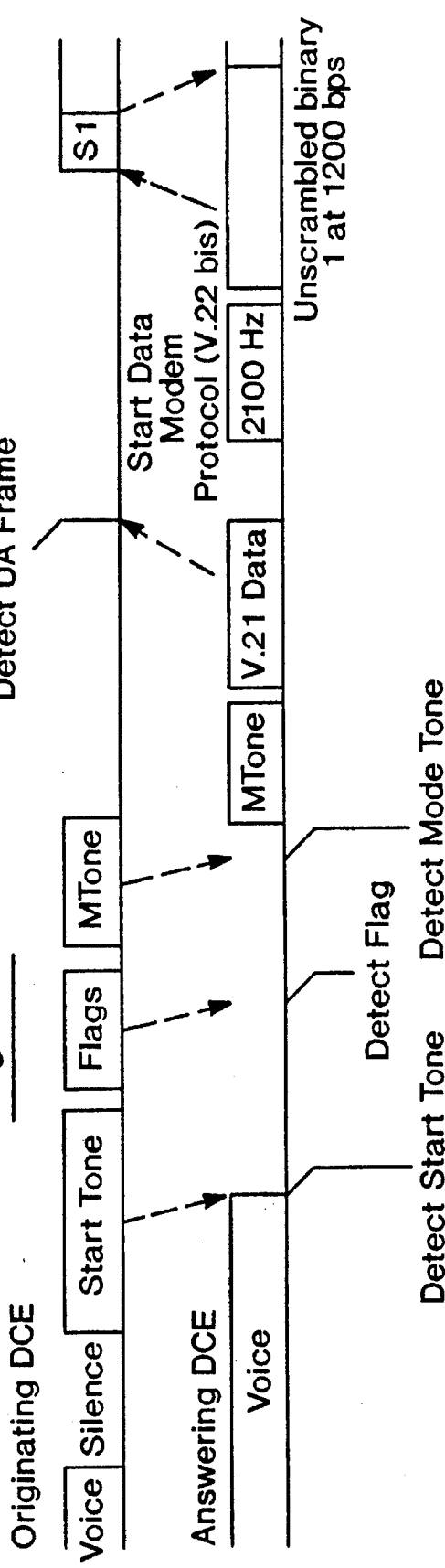
FIG. 12 is a diagram of a successful data mode start sequence between an originating DCE and an answering DCE using modem data mode (V.22bis protocol).
Figure 13:
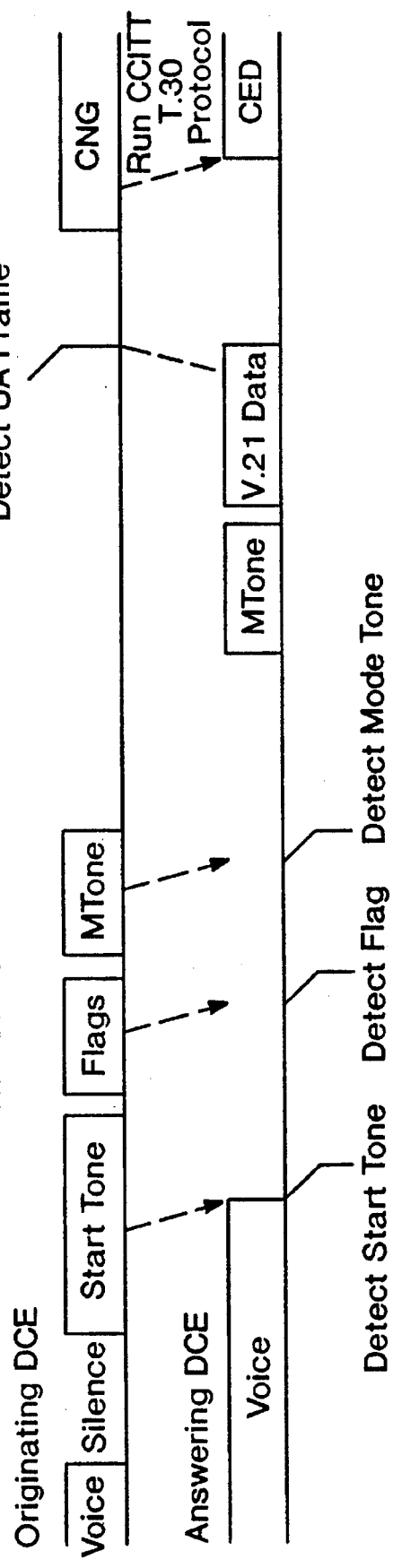
FIG. 13 is a diagram of a successful data mode start sequence between an originating DCE and an answering DCE using facsimile data mode (CCITT T.30 protocol).

FIG. 11 shows an alternative embodiment of the start sequence in which the mode tones have been replaced with a V.21 HDLC frame. The two mode bytes identify the mode of the data to be transferred. The first mode byte has the form of 000001XX through 111111XX (i.e., it cannot be 000000XX). This allows support of 64,512 modes. However, the two mode bytes should be coded to avoid sequences of five or more consecutive ones to avoid bit stuffing. Client data blocks transmitted with V.21 modulation begin with three HDLC flags, an address byte, a control byte, and a number of data bytes and conclude with two CRC bytes and one or more HDLC flags. The address and control bytes have a double meaning in that they identify the transfer is at V.21 and the HDLC frame type. Alternatively, subsequent data blocks transmitted with non-V.21 modulation are preceded by a V.21 header containing three HDLC flags followed by two mode bytes, two CRC bytes, and a number of HDLC flags. This alternative protocol offers minor savings in the start-up time for single data block transmissions, and more substantial savings in the transmission time for multiple block transfers. It also allows new data modes to be identified without incurring additional overhead, unlike the mode tone/custom data mode approach previously described.

Once the hardware of the answering DCE detects a valid mode signal as part of the complete data mode start sequence, it configures itself to support the data modulation scheme indicated by the mode tone and reports the data mode request to the DTE if it is currently configured with those capabilities. If it does not support the data mode, it rejects the request and returns to voice mode. If a request for VoiceView data mode is accepted, the originating DCE should begin sending the data carrier as soon as possible (but not within 5 msec) following the end of transmitting the mode signal. In other data modes, the DCE does not initiate data carrier until so instructed by a command from the DTE. The answering DCE readies itself to receive or transmit data as soon as possible following the end of the mode tone. In each data mode, data transfer does not actually begin until the data modulation training sequence (if required) and/or handshaking (if required) are completed.

3. Data Transmission Mode. Many DCE's are capable of transmitting data in any of a variety of different data modes as previously discussed (e.g., modem, facsimile, and custom data modes). However, VoiceView™ data mode represents the fundamental functionality of the DCE in regard to communication of visual forms. During VoiceView™ data mode, information may be transmitted in both directions between DCEs in a half-duplex manner. One of the DCEs must maintain the master role in controlling the data link throughout the transaction. The originating DCE starts the transaction as the master because it must send the first data message. The originating station can control whether the link will operate in either a one-way or two-way alternating scenario for this transaction. The link control uses terminating characters at the end of each data message to pass control of the link from one station to the other.

In a one-way scenario, the originating side sends the data message and indicates that it will not accept a response during this transaction. When the message is acknowledged the two DCEs return to voice mode. If the answering DCE needs to transmit data, it waits until the originating DCE has completed its data transmission and the two DCEs have returned to voice mode. Then the answering DCE can initiate the data mode start sequence and become the originating DCE in order to transmit the data that it has available.

For the two-way alternating scenario, the originating DCE will indicate to the answering DCE at the end of its data message that it will accept a data message response. If the answering DCE needs to transmit data, it can then transmit its data message. At this point the answering DCE can control the link using the indicator at the end of its data message. The answering station can decide either to accept or not accept a data message response. if the answering DCE will accept a data response, control of the link will again revert to the originating DCE. Either DCE can request a disconnect of the data link at any point in the transaction at which it is capable of transmitting an HDLC frame.

As discussed in the previous section, three transmission rates are used to convey data during VoiceView data mode: priority rate, recovery rate, and burst rate. Three default modulation schemes corresponding to these rates are: V.21 300 bps FSK, V.27ter 4800 bps DPSK, and V.29 9600 bps QAM.

The VoiceView data link layer protocol is based on HDLC, as discussed below, and transmits information synchronously in data frames. Each frame begins and ends with one or more unique octets, termed "flags." The recipient of data frames provides acknowledgment to the sender via an HDLC acknowledgment frame. The number of data frames that can be transmitted before an acknowledgment is required is known as a window. in VoiceView data mode, up to a window's worth of frames can be transmitted sequentially in a "data block." Since VoiceView data mode is a half-duplex protocol, one data block at a time is transmitted by the DCE and must be acknowledged by the far-end DCE before the next data block is sent.

The originating DCE initiates the modulation carrier, starts the training sequence (if any), and transmits the starting data block as a result of receiving an initiate data session indication and at least the first frame of data to be transmitted from its DTE. After transmitting each data block, the DCE terminates transmission of the data carrier and immediately configures itself to receive data. If the originating DCE receives any response from the answering DCE after transmitting a starting data block, it uses a "subsequent block" format for all subsequent transmissions during the current data transaction until returning to voice mode. The subsequent block format consists of a mode signal (e.g., MTone), followed by a data block modulated at either the burst, recovery, or priority data transmission rate as indicated by the mode signal. However, if the transmission rate is V.21 300 bps and the HDLC mode indicator is used, only the data frame is sent because the mode signal is included within the frame.

The mode tone is used to indicate the modulation scheme for subsequent data blocks as it did for the starting data block format. The data modulation training sequence used for subsequent data blocks is the same as that used for the starting data block with one exception. When V.17 modulation is used, the short train (142 msec) is employed for subsequent data blocks transmitted after the first data frame has been successfully acknowledged.

The subsequent data block format is also used by the answering DCE when transmitting any HDLC frames while in VoiceView data mode. All data blocks containing a single HDLC Supervisory or Unnumbered frame must be sent efficiently and reliably since these frames cannot be retransmitted if an error occurs. Therefore these data frames are transmitted using the subsequent data block format at the burst transmission rate (V.21 300 bps FSK). This format is referred to as the "response data block" format and is used to exchange data in certain circumstances outside of VoiceView data mode, as follows:

(a) to acknowledge or reject the data mode start sequence for all data modes;

(b) to send the DISC frame when rejecting a request to switch to an unsupported data mode;

(c) to send the UA (Unnumbered Acknowledgment) to accept the switch to the requested data mode;

(d) to send capabilities response information in Unacknowledged Information (UI) frames when responding to the capabilities query.

Whenever any data frames are transmitted using the response data block format, the data block begins with three HDLC flags in order to satisfy V.21 data synchronization requirements.

4. Data Link Layer Protocol. The present invention can be viewed in terms of the lowest three layers of the OSI (Open Systems Interconnect) model protocol stack as described in ISO 7498-1. These layers are: layer 1—physical layer; layer 2—data link layer; and layer 3—network layer. The physical layer involves the electrical connection to the telephone network, including the DCE hardware used to support switching between voice and data modes, data transmission modes, etc. The data link layer (layer 2) protocol uses a subset of HDLC command and response frame types to enable the DCE to communicate with the far-end DCE. The data link layer protocol provides the following functions: switching between voice and data modes, unacknowledged information transfer of capabilities information, and provision of an error-controlled data link protocol for data mode. In particular, the data link layer protocol can initiate the DCE hardware's switch between voice and any supported (modem, facsimile, or VoiceView) data mode. It manages the establishment of data mode either when requested by command from the DTE, when events are received from the far-end DCE, or as a result of events reported by DCE hardware. In addition, the data link layer entity provides the following services for data transmission within data mode:

(a) Indicates to the physical layer the half-duplex link direction (sending or receiving) and data modulation rate in which it should be operating.

(b) Segments data (messages) received from the DTE interface into link layer frames for transmission over the telephone network interface.

(c) Assembles data in Information (I) frames or Unnumbered Information (UI) frames received from the far-end DCE into a contiguous data stream comprising an entire message that is passed to the DTE.

(d) Detects errors in received messages using sequence numbers and a Frame Check Sequence (FCS). Error correction is performed via retransmission of frames.

The data link layer protocol also provides the following services in support of the capabilities query function:

(a) It assembles capability information received from the DTE into a UI frame for transmission to the far-end DCE.

(b) It indicates to the far-end DCE when a capabilities information exchange (rather than just a notification) is desired.

(c) It extracts capability information present in UI frames received from the far-end DCE and conveys the information to the DTE.

For example, the data link layer protocol can be implemented using the following command and response frame types:

| Frame Type | Description |
| --- | --- |
| I | Information transfer, used to transfer sequentially numbered frames containing information provided by the DTE. |
| RR | Receive ready |
| RNR | Receive not ready, used to indicate a busy condition |
| UI | Unnumbered information, used to convey capabilities response messages |
| DISC | Discontinue, used either to terminate data mode or to reject a request to switch to an unacceptable data mode. |
| UA | Unnumbered acknowledgment, used to acknowledge receipt of an acceptable switch to a requested data mode. |

The data link layer protocol supports two modes of operation: idle mode and active mode. In idle mode, no data communications path exists between the DCE and the far-end DCE. Active mode must be established by both DCEs in order to communicate data or capabilities information between them. During idle mode, the DCE need only interpret requests to establish a DCE-DCE data mode connection from the DCE hardware and the DTE. A request for the DCE to enter active mode may take one of the following four forms: (1) receipt of a data mode start sequence event from the DCE hardware; (2) receipt of a capabilities query indication from the DCE hardware; (3) receipt of a request to transmit data from the DTE; or (4) a request to transmit a capabilities query from the DTE.

When the DCE is operating in the facsimile data mode or modem data mode, the data link layer protocol does not provide any services except for assisting the DTE in switching between data and voice mode. In facsimile data and modem data modes, information is transported directly through the DCE between the DTE interface and the physical layer of the telephone network interface, unless an optional error-correcting protocol is utilized. The data mode will be terminated when the DCE either detects a loss of carrier or receives an end of transaction indication, such as the ATH command (see below) from the DTE. Both of these events cause the DCE to return to voice mode.

To accept and continue an incoming data transaction, the DCE sends an acknowledgment to the received data mode start sequence. For modem data mode and facsimile data mode, the acknowledgment takes the form of the mode signal followed by or included within an HDLC flag-bounded UA frame transmitted with V.21 (high channel) modulation. The modem data modulation handshake does not begin until this acknowledgment sequence is completed.

The DCE includes a user-configurable option that determines whether it sends any response to the originating DCE after detecting a data mode start sequence. This option may be set from the DTE via the -SSR parameter (discussed below). If the parameter is set to response enabled and the DCE detects a data mode start sequence corresponding to a mode that it currently supports (as defined by the information in its capability data structure), it responds to the originating DCE with an acknowledgment.

The acknowledgment takes the form of a V.21 mode signal followed by or included within either the UA, RR, or RNR frame. The answering DCE receives the first window of data immediately after the start data mode sequence. If at least the first frame of data in the window is received correctly, the answering DCE responds with an RR or RNR to acknowledge the last good frame received. If the data mode start sequence was received, but not even the first frame of data was correct, the answering DCE responds with a UA frame instead.

When the originating DCE sends any start data mode sequence, it starts a response timer. For example, the timer is started after the transmission of the mode tone is complete for fax and modem data modes and after the last data byte of the starting data block is sent in VoiceView data mode. If no acknowledgment is received before the timer expires, the originating DCE abandons the attempt to establish data mode and returns immediately to voice mode.

If an answering DCE detects a data mode start sequence that represents a mode that it currently does not support (as defined by the information in its capability data structure), it responds to the originating DCE with the V.21 mode signal followed by or included within an HDLC flag-bounded DISC frame transmitted with V.21 (high channel) modulation. The DCEs then immediately return to voice mode.

Figure 16:
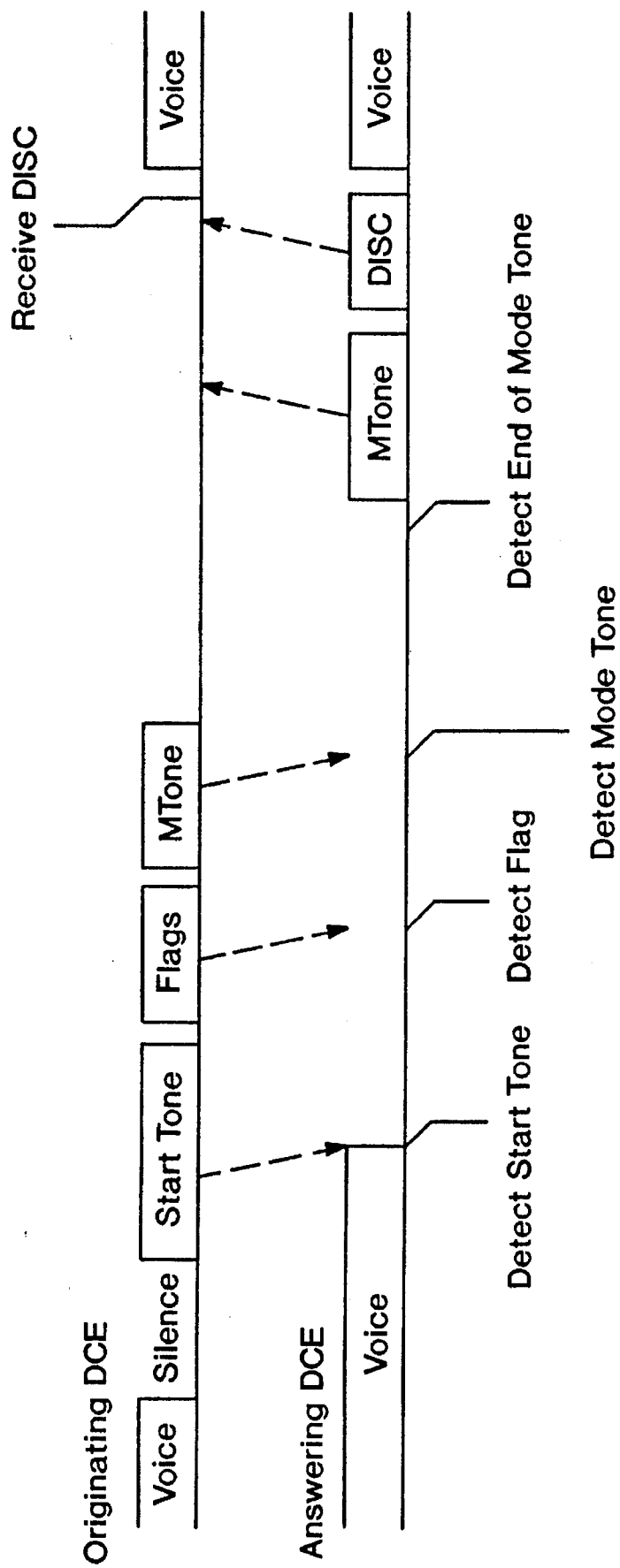
FIG. 16 is a diagram of an unsuccessful data mode start sequence for fax or modem data mode in which the start sequence is rejected by the answering DCE.

The DCE can determine when to reject a data mode request without any interaction with the DTE. However, the DTE is still notified by the DCE that the data mode start sequence was received. The DCE uses the information stored in its capabilities data structure to determine whether to accept or reject a switch to a data mode. The DTE is responsible for managing the capability data structure that contains the data transmission capabilities currently supported in the DCE. The DCE may also reject a switch to data mode request if it has no available data buffers or if the DTE is not active. When an originating DCE receives a DISC in response to its request to switch to that data mode, it immediately abandons the effort to switch to data mode, returns to voice mode, and notifies its DTE. The rejection scenario for responding to a modem or facsimile data mode start sequence is illustrated in FIG. 16.

The link layer terminates active mode and returns to idle mode operation upon any of the following events:

(a) receiving an indication to terminate the data transaction (e.g., end of transaction, data mode rejected, capabilities exchange complete) from its DTE;

(b) receiving an indication that data mode has been terminated (e.g., loss of carrier) from the DCE hardware while in modem data mode or fax data mode;

(c) encountering an unrecoverable data link error, such as no response from the far-end DCE, or receiving a DISC message from the far-end DCE while in VoiceView data mode.

When the DCE terminates active mode, it also informs the DCE hardware to return to voice mode.

Figure 17:
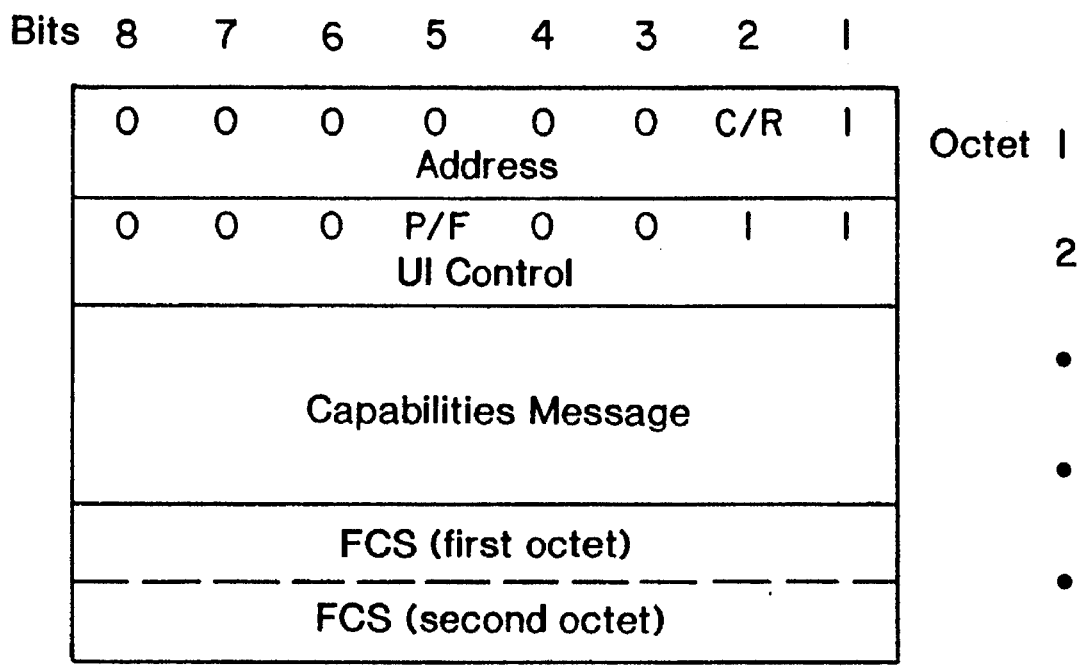
FIG. 17 is a diagram of the message format used for communicating capabilities information between DCEs.

The data link layer protocol supports the notification and exchange of capabilities information using the HDLC unacknowledged information transfer mode. When the answering DCE receives an indication from its physical layer that a capabilities query has been received, it enters active mode and notifies the DTE of the event. The DTE assembles the DCE's capabilities information into a capabilities response message and notifies the DCE that it is ready for transmission to the far-end DCE. The capabilities information is transferred between DCEs using a flag-bounded UI (Unnumbered Information) frame at the burst data rate unless the transmission time is calculated to exceed one second. Otherwise, the information is sent using the recovery rate. The contents of the frame are shown in FIG. 17. The answering DCE may respond to a capabilities query with the UI frame with the poll bit (P) set to 0 and the C/R bit set to 0. In this case, the DCE returns to idle mode.

When a DCE that has originated a capabilities query receives the capabilities response UI frame with the P bit set to 1, it interprets it as a request to exchange capability information. Upon receiving the polling UI frame, the DCE reports both the data contents of the frame as well as an indication of the exchange request to its DTE. In response, the DTE assembles its capabilities information into a capabilities message and requests that it be transmitted to the far-end DCE. In a capabilities response, the F bit is set to 1 and the C/R bit is set to 1 in the UI frame. The DCE returns to idle mode and informs its physical layer to return to voice mode after transmitting the frame.

The VoiceView data mode utilizes a data link layer protocol that provides synchronous transmission of data as specified in the HDLC procedures. Because the protocol is intended for use in the VoiceView half-duplex environment, only a subset of the standard HDLC procedures is used. In VoiceView data mode, information is transferred using the two-way alternating method. This means only one DCE can transmit data at a time. The transmitting DCE assumes the role of master of the data link. The other DCE must acknowledge the received data and wait until the sending DCE completes its data message before it is allowed to transmit data. The originating DCE always has the first ability to transmit data in a data transaction. In the present invention, it is possible that either DCE may begin a data transaction by assuming the role of an originating DCE. However, the VRU DCE 24 typically functions as the originating DCE due to the nature of the application.

When the DCE has data available to send, it segments the data into I frames containing up to no more than 256 bytes of data each. Up to 9 frames may be sent in a data block at a time. All of these frames must be acknowledged by the receiving DCE before new I frames can be sent. When the originating DCE sends the data mode start sequence to initiate VoiceView data mode, it does not wait for a response but sends the first data block immediately following the start sequence, as described above. The starting data block serves the dual purpose of initiating the switch to VoiceView data mode and transmitting over 2K bytes of data in one efficient transmission burst. However, after the starting data block has been transmitted an acknowledgment is required. The starting data block format is sent only once at the beginning of a data transaction. The subsequent data block format is used to exchange all other data frames between the DCEs.

The VoiceView data mode uses an adaptive selection of data modulation schemes. The DCE first transmits a starting data block using the priority transmission rate to transport the data. If the starting data block is transmitted and no response is received from the answering DCE before the acknowledgment timer expires, the originating DCE aborts data mode, notifies its DTE with an ERROR result code, and immediately returns to voice mode. if an acknowledgment is received before the timer expires, indicating that only some of the data was received correctly, the DCE initiates retransmission of the data. However, this time the data is sent using the subsequent data block format. If a UA frame was received, the entire window of data frames is retransmitted using the priority transmission rate. If an RR has been received, only those unacknowledged frames are retransmitted at the priority data rate.

After the first retransmission, if no response is encountered before the time out or only some of the frames are successfully acknowledged, the DCE retransmits the remaining unacknowledged frames in a subsequent data block one last time using the recovery transmission rate (or burst rate if recovery rate was used the first two times). If the timer again expires, the DCE aborts data mode, immediately returns to voice mode, and notifies the DTE.

If the first data block is successfully delivered to the far-end DCE, the remainder of the data message is transmitted by the sending DCE using one or more subsequent data blocks. All the frames in a data block must be acknowledged before new frames are transmitted in a new block.

If a data block or portion thereof cannot be successfully transmitted at the priority transmission rate during a data mode transaction but is successfully retransmitted at the recovery transmission rate, the DCE automatically sends all remaining information data blocks during that data mode transaction using the recovery rate. This strategy minimizes transmission time of data on telephone connections with marginal transmission quality by avoiding subsequent transmissions at the priority rate that are likely to fail. This mode of operation is reset when returning to voice mode so that the next data mode transaction (i.e., a new data mode start sequence) will attempt transmission at the priority rate again.

If data frames (I frames) are transmitted in both directions during VoiceView data mode, there is no requirement that both directions must use the same transmission rates. The information may be transmitted in one direction at a different transmission rate from the other depending on line quality and DCE capabilities. The use of a mode tone to start the data block transmission allows the selection of varying data rates. In general, all I frames transmitted by a VoiceView DCE are transmitted as follows:

(a) The first transmission of either a starting or subsequent data block uses the priority transmission rate (default 9600 bps).

(b) The first retransmission of some or all unacknowledged frames in the data block is transmitted at the priority transmission rate.

(c) The second and final retransmission of unacknowledged frames in the data block uses the recovery transmission rate (default 4800 bps).

5. Network Layer Protocol. The network layer protocol (layer 3) is necessary to manage the transmission of data messages across the half-duplex data link through the telephone network. The network layer protocol for VoiceView data mode provides:

(a) a means to indicate the end of a data message;

(b) an indicator that signifies that the sender wishes to complete the data transaction and that standard data link layer acknowledgments and link release procedures are expected;

(c) an indicator that signifies that the sender wishes to complete the data transaction and requests immediate return to voice mode without standard data link layer acknowledgments and link release procedures;

(d) an indicator that passes control of the link to the far-end station by allowing it to transmit a data message;

(e) an indicator that signifies that the current message is the last it has to send in this transaction; however, the receiving entity should provide a single data message response;

(f) an indicator that signifies that the current data message is incomplete and has been prematurely aborted by some user or DTE action.

A network layer (layer 3) data message sent from one VoiceView DCE to another via the telephone network is terminated by one of the following two-character sequences: <DLE><EOT>, <DLE><ESC>, <DLE><ETX>, <DLE><ETB>, or <DLE><CAN>. When one of these sequences is received from the far-end DCE, it is both processed by the receiving DCE as well as passed to its local DTE.

The <DLE><EOT> is used to perform a one-way simplex data transaction as well as to terminate a two-way alternating data transaction. One-way simplex operation supports data transfer only from the originating DCE to the answering DCE. Two-way alternating operation allows data messages to be transferred in both directions during a single data mode transaction. The <DLE><EOT> string indicates both the end of the message and the normal end of the transaction. The DCE receiving this string in an I frame performs standard data link functions to acknowledge outstanding I frames and remain in data mode. Once the DCE that sent the <DLE><EOT> receives the acknowledgment (RR), it automatically transmits a DISC frame and then returns to voice mode. The DCE receiving the DISC returns immediately to voice mode upon processing the DISC frame.

The <DLE><ESC> is similar to the <DLE><EOT> except that it requests the receiving DCE to return immediately to voice mode after detecting the string. The receiver immediately returns its data link layer to the idle state and does not attempt to acknowledge any outstanding I frames. All correctly received data is transferred to the DTE. The DCE that sends the <DLE><ESC> places its data link layer in idle mode and returns to voice mode as soon as the string has been transmitted to the telephone network interface.

The <DLE><ETX> string is used to provide two-way alternating operation. The <DLE><ETX> indicates the end of the message as well as the sending DCE's consent to relinquish control of the data link. In two-way alternating mode, only the DCE with control of the link (master) may transmit a data message. In addition, the DCEs must alternate sending messages (i.e., a DCE cannot transmit two data messages in a row without receiving a message from the other DCE during a single data mode transaction). Once a DCE transmits the <DLE><ETX>, it waits for acknowledgment of the I frames and then starts a timer. If it does not receive a valid I frame from the far end before the timer expires, the data link is released and the DCE returns to voice mode.

Once a receiving DCE detects the <DLE><ETX> string at the end of a message, it first acknowledges the data frames, and then may proceed to transmit a data message if it has one available. The data message transmitted by this DCE may be terminated with any of the message terminating strings above. To continue in two-way alternating mode, the message terminates with a <DLE><ETX>. This allows the other DCE to again control the data link. If no data is available to transmit when the DCE receives a <DLE><ETX> terminated message, the DCE starts a timer. If the timer expires before the DCE receives data from the DTE, it transmits nothing to the far-end DCE, returns to voice mode, and sends a <DLE><CAN> to the DTE.

The <DLE><ETB> is used to end the data mode transaction after a single data message response. The DCE transmitting this string indicates that it has no more data to send but expects a single data message response. Once a receiving DCE detects the <DLE><ETB> string at the end of a message, it first acknowledges the data frames, and then may proceed to transmit a data message if it has one available. The data message response ends with either a <DLE><EOT>, <DLE><ESC>, or <DLE><CAN> or will be considered an error. If this error is encountered by the DCE receiving the message, it sends a DISC frame to the DCE transmitting the message and returns to voice mode. If no message is available to transmit when the DCE receives a <DLE><ETB> terminated message, it starts a timer. If the timer expires before the DCE receives data from the DTE to transmit, it returns to voice mode and sends a <DLE><CAN> to the DTE.

The <DLE><CAN> string indicates both the end of the message and the abnormal end of the transaction. A DTE that is transmitting a data message will typically terminate a message with this string rather than the <DLE><EOT> if the message is incomplete because it has been terminated abruptly by a user action. The DCE receiving this string in an I frame functions as though it received the <DLE><EOT> string. It performs standard data link functions to acknowledge outstanding I frames and remains in data mode. Once the DCE that sent the <DLE><CAN> receives the acknowledgment (RR), it automatically transmits a DISC frame and then returns to voice mode. The DCE receiving the DISC immediately returns to voice mode upon processing the DISC frame. 6. Capabilities Query. The capabilities query is used to query the far-end station to determine whether it is equipped with a switched voice/data DCE device and to determine its current capabilities. The capabilities query can also be initiated by a DCE to identify itself to the far-end DCE using the two-way capabilities exchange. The query is designed so that if the far end is not equipped with a compatible DCE, the phone user receiving the query will be minimally inconvenienced by hearing a short burst of tone. However, if the far end is equipped with a compatible device, it will switch to data mode, quickly respond to the query, and then return to normal voice mode. Typically the entire query/response sequence will be completed in less than one second.

Figure 14:
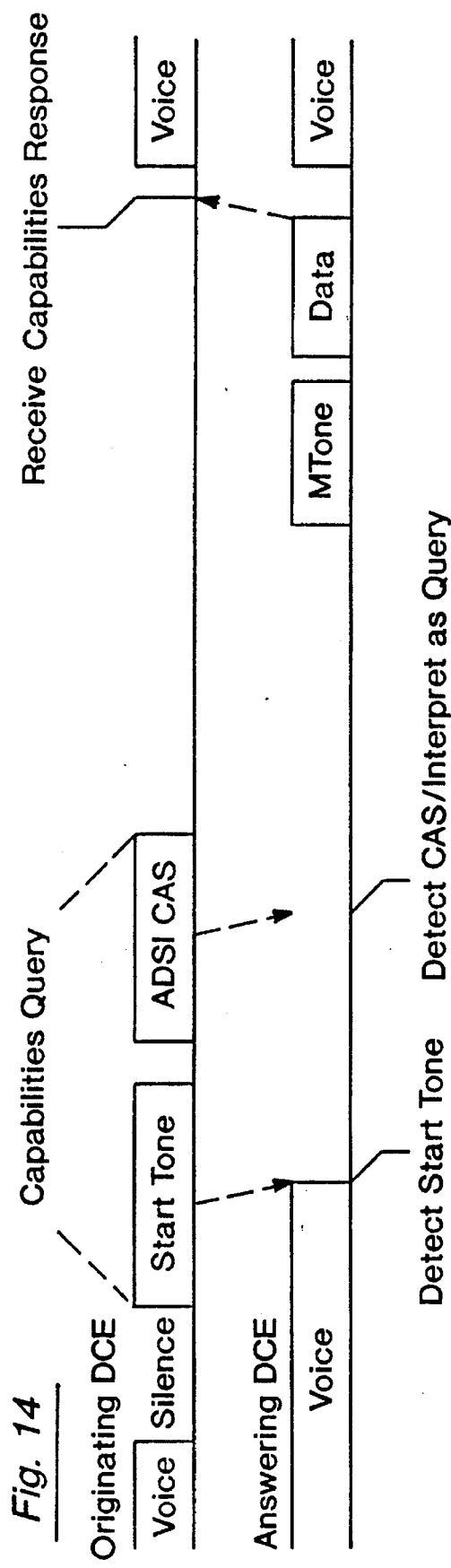
FIG. 14 is a diagram of a capabilities query and response sequence for a DCE.

The query consists of a silence period, followed by the VoiceView start tone, followed by the ADSI CPE Alerting Signal (CAS) having nominal frequencies of 2130 Hz and 2750 Hz for a duration of 80 to 85 msec as defined in Bellcore TR-NWT-000030. A DCE detecting a start tone switches into data mode. If a valid CAS tone is confirmed within 290 msec of the beginning of the start tone, it is interpreted as a capabilities query. if neither a CAS tone nor an HDLC flag (indicating a start data mode sequence) is received within 290 msec of the beginning of a valid start tone, then the physical layer of the answering DCE returns to voice mode and informs its DTE of a talk-off occurrence. The query is implemented so that the far-end equipment will respond to it differently if the device is an ADSI-only CPE or a VoiceView DCE supporting enhanced capabilities. Therefore, the DCE originating a query must be able to detect the different possible responses to the query. An ADSI CPE will respond with a DTMF A tone (lower tone: 697 Hz; upper tone: 1633 Hz). In contrast, a VoiceView DCE which receives a capabilities query responds with a capabilities response message rather than the DTMF A tone. The capabilities response consists of a mode tone followed by data in a flag-bounded HDLC UI frame transmitted at the rate identified by the mode signal. It is typically transmitted using V.21 300 bps modulation. If the HDLC mode indicator format is used, only the UI frame is sent because the mode indicator is included within the frame. If the transmission time of the frame will exceed one second, the recovery transmission rate is used instead. The format of this message is described above for VoiceView data mode. This query/ response scenario is shown in FIG. 14.

Figure 15:
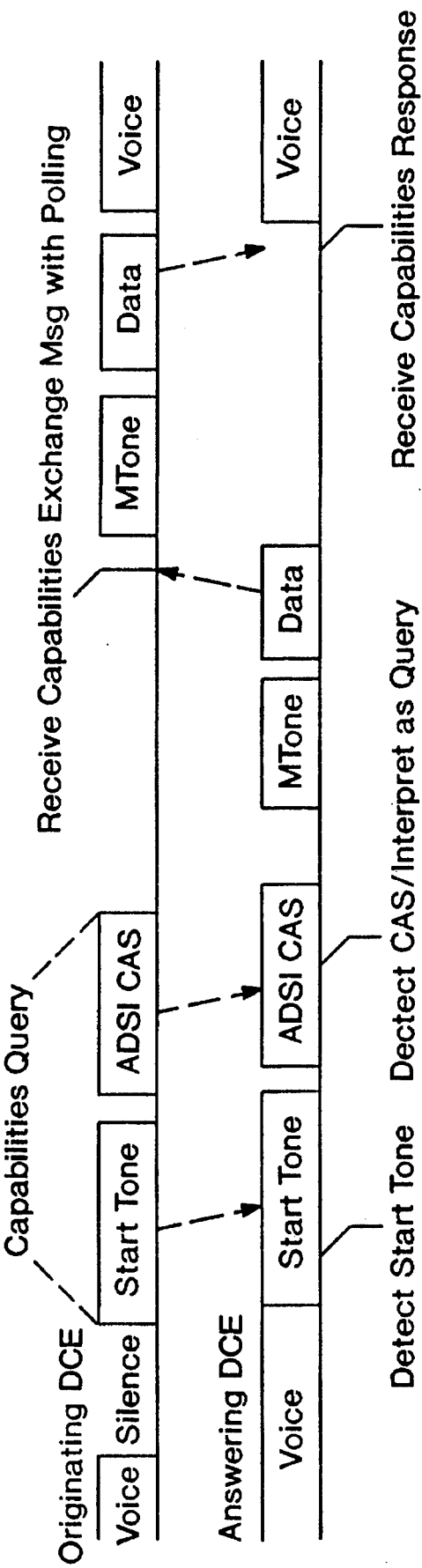
FIG. 15 is a diagram of a capabilities exchange sequence for a DCE.

The answering DCE switches to data mode upon detecting the start tone and returns to voice mode after the capabilities query/response scenario is complete. However, the answering DCE's physical layer returns to voice mode only after being directed to do so by the DTE because a two-way capabilities exchange may occur, rather than the simple query/response scenario shown above. The answering DCE can be optioned to perform a two-way capabilities exchange, rather than simply responding to a query with its own capabilities information. When so optioned, a capabilities message with polling is returned in response to the query instead of the normal capabilities response message. The answering DCE remains in data mode until either a response is received from the originating DCE or a timer expires. This bidirectional exchange of capabilities information is shown in FIG. 15. Once a DCE determines the far-end capabilities, it can switch between different data modes during the course of a call by using the start tone followed by a different mode signal.

Figure 18:
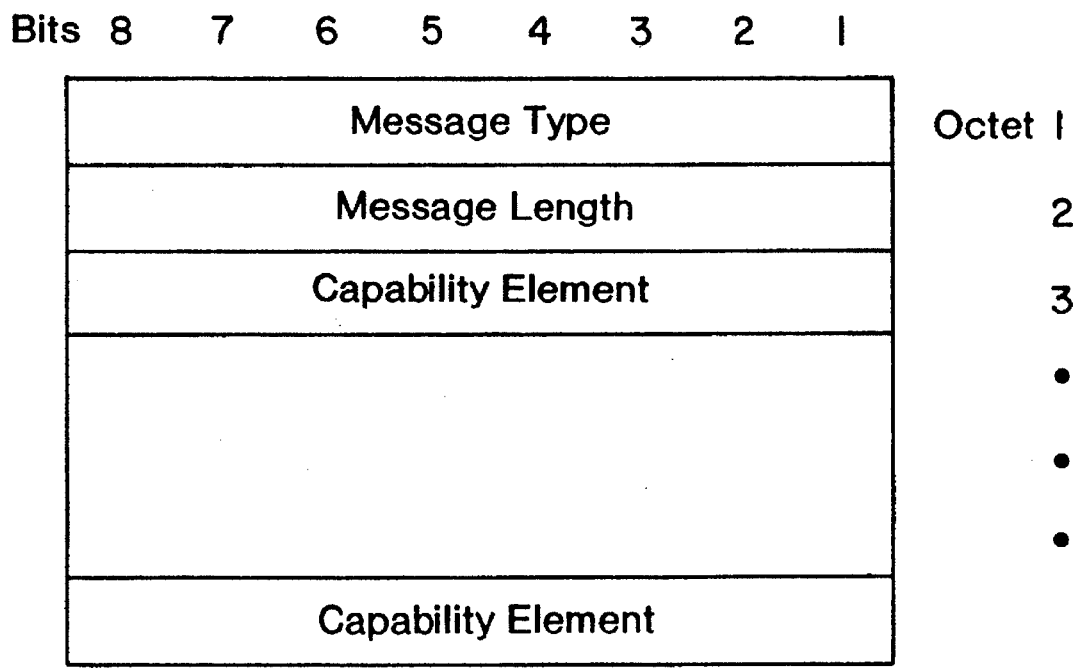
FIG. 18 is a diagram of the format of the capabilities query message I-field.

The DCE maintains a capabilities data structure detailing the inherent data communications capabilities that it supports. The DTE interface parameter -SCD enables the capabilities options of the data structure to be queried and changed by the DTE. The DCE will also transmit its capability information to the far-end DCE when responding to a capabilities query or a two-way capabilities exchange request (polling capabilities response) by means of the information field of a UI frame as shown in FIG. 18. When a DCE receives this information in response to a capabilities query, it is reported to the DTE.

The DCE may include as many capability elements as necessary in the capabilities response message in order to fully specify the DCE's capabilities. The DCE's processor builds the message based on the current information in the DCE's capabilities data structure. The data structure includes features inherently supported by the DCE (unless they have been disabled by the DTE) and capabilities explicitly written to the DCE's capabilities data structure by the DTE. Capabilities elements may be included in the message in any order. Capability elements may take any of the four forms shown in FIGS. 19a–19d.

The first octet of every capability element indicates the form of the element and specifies the capability type identifier. The two high order bits (7 and 8) of octet 1 comprise the form field. This field indicates the number of octets that follow the first octet in the capability element. A "00" indicates that there are no octets of information following, "01" indicates one octet, "10" indicates two octets, and "11" indicates a variable number (3 or more). When the coding "11" is used, the second octet specifies the length of the capability element in octets. This length field is coded using the same rules as the message length field described above (i.e., only octets following the length field are included in the length). The different capability element forms allow for future growth in the number of options that can be specified for any capability type specified in the identifier field.

Figure 19A:
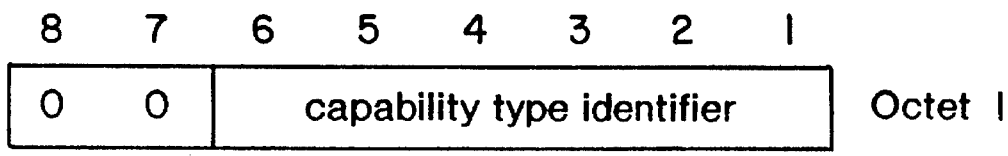
FIGS. 19a through 19d are diagrams of the formats of capability elements within a capabilities query message for: (a) single octet format; (b) double octet format; (c) triple octet format; and (d) variable length format for three or more octets, respectively.
Figure 19B:
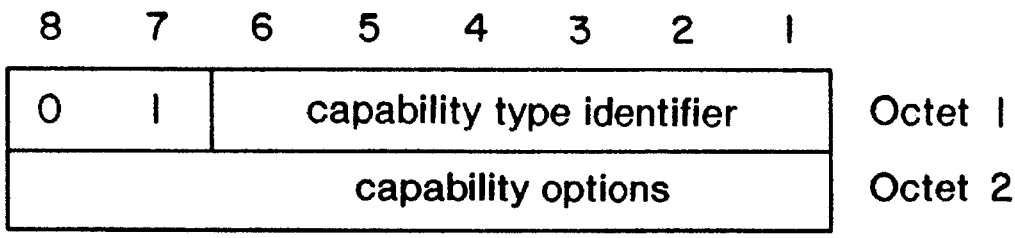
Figure 19C:
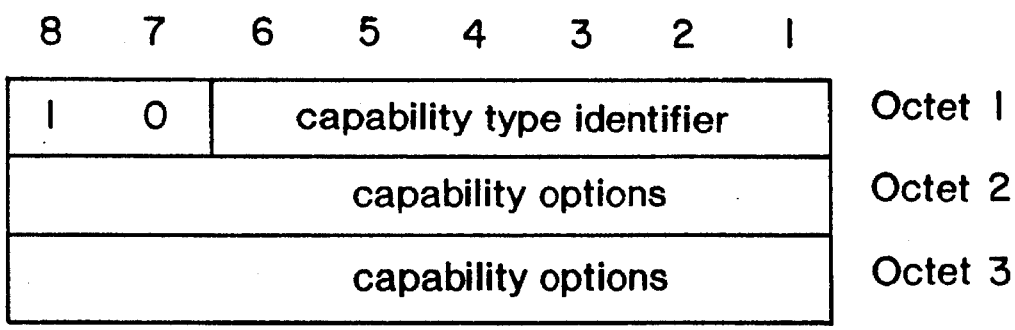
Figure 19D:
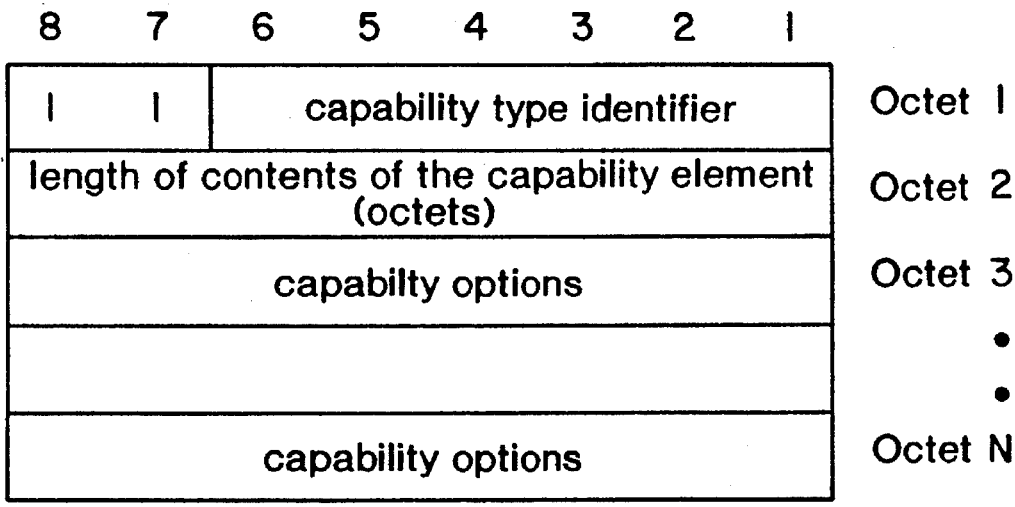

Whenever a capability element is coded using the single octet form as shown in FIG. 19a, it implies that the DCE supports only the default options associated with that capability. When a capability element is included using a form other than the single octet ("00") form, it is interpreted as indicating support of default as well as the optional capabilities that are indicated in the options octets. Bits 1 through 6 in octet 1 define the capability type identifier field. The coding of the field identifies the type of capability that is supported. The value specified for this field represents the same capability regardless of the form of the information element used. Therefore, support for a capability type can be specified using multiple forms depending on the number of capability options that are currently supported. The coding for standard capabilities types is shown in FIG. 20.

Data Terminal Equipment (DTE)

1. DTE Overview. The data terminal equipment or DTE at the client station 100 typically consists of a computer processor 10 with an associated display 15, keyboard, and an optional mouse. For example, the DTE can be implemented with a conventional personal computer. The DTE at the server station 200 may also consist of the processor 20 of a personal computer with a display 25, keyboard, and optional mouse, as illustrated in FIG. 1. However, in the alternative embodiment of FIG. 2, the server station DTE is the VRU processor 20. In either case, the DTE communicates with its DCE via a serial asynchronous interface 13 compatible with TIA/EIA-232-E (including CCITT V.24) circuits. However, the DCE and DTE data exchange is not limited to a serial interface. The DTE-DCE interface may be implemented in any environment that provides a character serial bidirectional data stream, including, but not limited to, processor bus attached boards, local area networks, Small Computer Systems Interface (SCSI), ANSI X3.131, IEEE 1284, etc. However, the DTE-DCE data interface should be capable of transmitting at least 9600 bps in a duplex mode.

Communication between the DCE and the DTE utilizes extensions to the AT commands specified in TIA/EIA-602 and TIA/EIA-615, in a manner similar to that used to communicate with conventional modems. A command line is a string of characters sent from the DTE to the DCE while the DCE is in command state. Command lines have a prefix, a body, and a terminator. The prefix consists of the ASCII characters "AT." The body is a string of commands and associated parameter values. The DCE maintains a parameter for control and identification of the active service mode. This parameter, +FCLASS, defines whether modem data services (+FCLASS=0), facsimile services (+FCLASS=1, 2, or 2.0), or VoiceView data services (+FCLASS=80) are active in the DCE. Additional values for the +FCLASS parameter can be assigned for other data modes.

The following is a summary of the action commands that can be sent by the DTE to the DCE while in the VoiceView service class:

| Command | Name |
|---|---|
| ATD | Dial Call |
| ATA | Answer Call |
| ATH | Hook Control |
| ATZ | Reset to Default Configuration |
| AT-SVV | Originate VoiceView Data Mode |
| AT-SAC | Accept Data Mode Request |
| AT-SIP | Initialize VoiceView Parameters |
| T-SIC | Reset Capabilities Data to Default Setting |
| AT-SSQ | Initiate Capabilities Query |
| AT-SDA | Originate Modem Data Mode |
| AT-SFX | Originate FAX Data Mode |
| AT-SRM | Retrieve Message |
| AT-SEM | Erase Message |
| AT-SMT | Mute Telephone |

In response to these commands, the DCE may transmit result codes, such as OK, CONNECT, RING, NO CARRIER, and ERROR, back to the DTE. The DCE may also transmit unsolicited event messages to the DTE in response to communications from the far-end DCE:

| Event Message | Name |
|---|---|
| -SSV | VoiceView Data Mode Start Sequence Event |
| -SFA | Facsimile Data Mode Start Sequence Event |
| -SMD | Modem Data Mode Start Sequence Event |
| -SRA | Receive ADSI Response Event |
| -SRQ | Receive Capabilities Query Event |
| -SRC: | Receive Capabilities Information Event |
| -STO | Talk-off Event |
| -SVM | VoiceView Message Available |

Finally, special character commands and responses can be transmitted between the DCE and DTE, as follows:

| Character | Direction | Description |
|---|---|---|
| <DLE><CAN> | DTE -> DCE | Abort data transfer in progress. |
| | DCE -> DTE | Data transaction aborted. DCE requests DTE to stop sending data. Error condition exists. If followed by OK, transaction was aborted by far end. If followed by ERROR, near-end DCE aborted transaction. |
| <XOFF> | either | Indicates not ready to receive data |
| <XON> | either | Indicates ready to receive data |
| <DLE><ETX> | either | End of message marker, continue transaction, response requested |
| <DLE><ETB> | either | End of message marker, final response requested after which the transaction will terminate |
| <DLE><EOT> | either | End of message marker, final message of transaction, no response accepted |
| <DLE><ESC> | either | End of message marker, DCE immediately returns to voice mode |

This section is intended to illustrate what transpires between the DTE and the DCE during different types of data transactions. During a data transaction, either DCE endpoint may transmit data as long as it is master of the link based on the two-way alternating protocol. However, for brevity, DTE-DCE communications associated with transmitting data to the far-end DCE are described in the "Originating a VoiceView Transaction" section and DTE-DCE communications associated with receiving messages from the far-end DCE are described in the "Receiving a VoiceView Transaction" section.

In the case of a VRU 35, the VRU processor 20 is typically programmed to follow a preprogrammed script for each telephone call. Most conventional VRUs are equipped with a high-level programming language or applications interface that enables the user to readily create scripts customized to the users particular needs. The commands listed above can be readily incorporated as an extension of the VRU programming language or applications interface so that voice and data communications can be readily intermixed within a single script.

2. Originating a VoiceView Data Transaction. This section describes the information exchanged between the DTE and the DCE when originating a VoiceView data transaction and when transmitting VoiceView data messages. First, the DTE prepares the DCE for a VoiceView data transaction by putting the DCE in VoiceView service class (+FCLASS=80). The DTE starts the transaction by issuing the AT-SW originate VoiceView data mode command. Unless an error condition exists, the DCE issues a CONNECT response meaning that the DCE is ready to receive data from the DTE. The DTE begins to download the data as soon as the CONNECT response is received. The DTE indicates that it has successfully finished transmitting the data in the current message by sending either a <DLE><EOT>, <DLE><ESC>, <DLE><ETX>, or <DLE><ETB> at the end of the message.

The DTE may terminate a data message by sending the <DLE><EOT> termination sequence to the local DCE. This sequence is used to mark the end of the data message and terminate the data transaction. When the local DCE receives the <DLE><EOT> sequence from the DTE, it interprets it as the End of Message (EOM) marker. The DCE transmits any data already buffered followed by the termination sequence to the far-end DCE. After the local DCE transmits the message and its data link layer has received an acknowledgment from the far-end DCE, both DCEs return to voice mode. The DCE issues the OK result code to the DTE once this has been successfully accomplished. The DCE issues the ERROR response if a failure occurred while transmitting the data to the far-end DCE.

Second, the DTE may terminate the data message by using the <DLE><ESC> termination sequence. The DTE uses this sequence when it wishes to send a data message and then immediately return to voice mode. The DCE interprets this sequence as the EOM marker as well as the end of the transaction. The DCE transmits any data already buffered followed by the termination sequence to the far-end DCE. When the last data block (window) of data frames is transmitted, the DCE does not wait for an acknowledgment but immediately returns to voice mode and issues the OK response to the DTE if the message was transmitted successfully. The DCE issues the ERROR response if a failure occurred while attempting to transmit the data to the far-end DCE.

Third, the DTE may terminate the data message by using the <DLE><ETX> termination sequence to invoke the two-way alternating message transfer mode. The DTE uses this sequence when it wishes to end the message but continue to allow data messages to be communicated in both directions between the DCEs. The DTE expects to receive a data message in response to sending the <DLE><ETX>. It will not transmit another data message until it receives a response terminated with either a <DLE><ETX> or <DLE><ETB>. The DCE interprets the <DLE><ETX> sequence as the EOM marker. The DCE transmits any data already buffered followed by the termination sequence to the far-end DCE and prepares to receive a data message response after acknowledgments.

Fourth, the DTE may terminate the data message by using the <DLE><ETB> termination sequence. The DTE uses this message to indicate that it has finished sending messages for this data transaction but that it expects a single data message response from the far-end. The DCE interprets the <DLE><ETB> sequence as the EOM marker. The DCE transmits any data already buffered followed by the termination sequence to the far-end DCE and then prepares to receive a data message response.

Alternatively, the DTE may terminate the data transmission in an abrupt fashion by using the <DLE><CAN> cancel sequence. When the DTE is transmitting data to the DCE, it always sends either the <DLE><EOT>, <DLE><ESC>, or <DLE><CAN> sequence to terminate the data transaction. The DCE must accept the <DLE><CAN> cancel sequence from the DTE even while the DTE is flow controlled off, allowing the originating DTE to cancel out of a stalled data transmission. The DCE interprets this sequence as an immediate abort command. The DCE transmits any data already buffered followed by the termination sequence to the far-end DCE. The DCE issues the OK response once the data has successfully transmitted to the far-end DCE. The DCE issues an ERROR response if there was a failure in transmitting the data to the far-end DCE.

3. Receivincl a VoiceView Data Transaction. This section describes the information exchanged between the DCE and the DTE when receiving VoiceView data messages. The DTE prepares the DCE to respond to VoiceView data mode start sequences by first setting +FCLASS=80. This parameter conditions the DCE to detect data mode start sequences and to notify the DTE when the VoiceView data mode start sequence is received. If the DCE receives a valid VoiceView data mode start sequence, the DCE starts a timer and sends an event message to the DTE. The DTE responds with an ATSAC accept data mode request command to continue the transaction. The AT-SAC command must be received by the DCE before the time expires. If the time expires, the DCE sends no response to the far-end DCE, flushes its buffers of any received data, and returns to voice mode after the received data carrier is lost.

The DCE to DTE data transmission may be terminated in three ways. First, the DCE may send the DTE the <DLE><EOT> or <DLE><ESC> sequence received from the far-end DCE followed by the OK message after the DCE has returned to voice mode. The DTE interprets either sequence as the end of the received message and end of data transaction. Second, the DCE may send the DTE a <DLE><CAN> cancel sequence followed by the OK message. This occurs if the DCE received a data message from the far-end DCE correctly, but the originating DTE had aborted the message early. The <DLE><CAN> cancel sequence was received as the message terminator in the data received from the far-end DCE. Third, the DCE may send a <DLE><CAN> cancel sequence followed by the ERROR message. The DCE issues the ERROR response if there was a failure in receiving or sending the data from/to the far-end DCE, such as not receiving any data within the time-out period. If the error occurred during receipt of a message from the far-end DCE, the DCE appends the <DLE><CAN> cancel sequence to the data being sent to the DTE.

The DTE can send the <DLE><CAN> cancel sequence to abort the data reception process. When the DCE receives this character sequence, it transmits the DISC link layer frame to the far-end DCE at its next opportunity, instead of an acknowledgment. This will terminate the data transmission. The DCE deletes all received data in its buffers and sends <DLE><EOT> to the far-end DCE. Once the DCE has completed the abort process it issues the OK message to the DTE.

4. Setting and Reading Capabilities Data. This section describes the information exchanged between the DTE and the DCE when setting and reading the capabilities data in the DCE's capabilities data structure. The DTE can set the data structure to the inherent capabilities of the DCE by issuing either the AT-SIP initialize parameters command or the AT-SIC initialize capabilities command. The DTE may read the capabilities data in the local DCE by issuing AT-SCD?. The DCE responds with its capabilities. The DTE can choose which DCE capabilities to enable (i.e., those which it has in common with the far-end DCE). The DTE can change capabilities already present in the capabilities data by nullifying the capabilities data structure and then writing the desired capabilities data to the DCE. The DTE nullifies the capabilities data by writing the <NULL> character to the -SCD: parameter. The DTE then writes the new capabilities data by issuing the AT-SCD: <capabilities> command.

5. Originating a Capabilities Query. This section describes the information exchanged between the DTE and the DCE when originating a capabilities query. The DTE initiates the capabilities query by first putting the DCE in Voice-View service class (+FCLASS=80). The DTE starts the transmission of the capabilities query with the AT-SSQ start query command. The DCE may issue five possible responses: -SRQ, -SRA, -SRC: <capabilities>, ERROR, OK, and combinations of some of these responses. The DCE issues the -SRA message if the responding endpoint indicates that it supports ADSI capabilities only. The -SRA message is immediately followed by the OK response message. The DCE returns the SRC: <capabilities> message to the DTE if the answering DCE responds with VoiceView capabilities. The DCE will also issue an SRQ message following the -SRC: <capabilities> message if the query response from the far-end DCE requests a two-way exchange of the DCE's capabilities (polling was set). In this case, the OK response is issued after the local DCE's capabilities are transmitted and the DCE returns to voice mode. If the far-end DCE does not request a two-way exchange of capabilities (polling not set), then the -SRQ message will not be issued and the OK response is issued as the final result code when the DTE returns to voice mode.

6. Receiving a Capabilities Qued. This section describes the information exchanged between the DTE and the DCE when the DCE responds to a VoiceView capabilities query. The DCE issues the SRQ message to the DTE whenever a capabilities query is detected. If the -SQR query response parameter is set to respond to the query by simply sending a capability response message (one-way exchange) to the originating DCE, then no other messages are issued to the DTE as a result of the query and the DCE is ready to accept the next command. If the -SQR query response parameter is set to request a two-way exchange of capability information with the originating DCE, then the -SRQ message is followed by the -SCD: <capabilities> message when the capabilities data is received.

The foregoing discussion has presented a high-level description to show the inventive concepts of this telecommunication system in a concise and understandable manner, as well as to enable persons skilled in this art to practice the invention. There are, of course, many more details involved in implementing the invention that are common and known to persons skilled in the art, such as implementing the HDLC protocol and the details of presenting a suitable user interface for the modem, the application layer, data compression algorithms, and the like.

The above disclosure sets forth a number of embodiments of the present invention. Other arrangements or embodiments, not precisely set forth, could be practiced under the teachings of the present invention and as set forth in the following claims.

We claim:

1. A telecommunication system for providing voice and data communications via a telephone line comprising:
   a client station having:
   (a) a modem for data communications over said telephone line;
   (b) a telephone for audio communications over said telephone line;
   (c) a client processor controlling said modem, said client processor also including a definition of a visual form having at least one control with predetermined properties, including properties defining permissible actions that can be taken with respect to each control and instructions to be executed by said client processor in response to said actions;
   (d) a display controlled by said client processor for displaying said visual form; and
   (e) input means in communication with said client processor for selecting a control in said visual form and performing an action on said selected control;
   wherein at least one of said controls includes a property directing said client processor in response to a predetermined action to direct said modem to transmit data identifying said action; and
   a server station in communication with said client station over said telephone line, said server station having:
   (a) means for audio communications over said telephone line;
   (b) a modem for data communications over said telephone line; and
   (c) a server processor in communication with said modem and including programmed instructions to be executed by said server processor in response to said actions received from said client station, said server processor also including a definition of a form having at least some controls in common with said client station visual form that are updated by said server processor to reflect actions received from said client station.

2. The telecommunication system of claim 1 wherein said means for audio communication for said server station comprise a telephone set for use by a live operator, and wherein said server station further comprises a display controlled by said server processor for displaying said server form.

3. The telecommunication system of claim 1 wherein said means for audio communications for said server station comprise a voice card controlled by said processor for transmitting prerecorded audio messages over said telephone line, and wherein said server processor directs said voice card to transmit selected audio messages in response to said actions received from said client station.

4. The telecommunication system of claim 1 wherein said control comprises a field for entry of data.

5. The telecommunication system of claim 4 wherein said control properties comprise instructions for validating data entered in said field.

6. The telecommunication system of claim 1 wherein said control comprises a push button.

7. The telecommunication system of claim 1 wherein said control comprises a list containing a plurality of options that can be selected by said input means.

8. The telecommunication system of claim 1 wherein said control comprises a field displaying specified text.

9. The telecommunication system of claim 1 wherein said control comprises a field displaying a specified image.

10. The telecommunication system of claim 1 wherein said definition of said visual form used by said client station is transmitted by said server station over said telephone line to said client station.

11. A telecommunication system for providing voice and data communications via a telephone line comprising:
    a client station having:
    (a) a modem for data communications over said telephone line;
    (b) a telephone for audio communications over said telephone line;
    (c) switching means for selectively connecting said telephone to said telephone line in a voice mode, and for disconnecting said telephone and connecting said modem to said telephone line in a data mode;
    (d) a client processor controlling said switching means and modem to automatically switch from said voice mode to said data mode prior to communicating data over said telephone line; said client processor also including a definition of a visual form having at least one control with predetermined properties, including properties defining permissible actions that can be taken with respect to each control and instructions to be executed by said client processor in response to said actions;
    (e) a display controlled by said client processor for displaying said visual form; and
    (f) input means in communication with said client processor for selecting a control in said visual form and performing an action on said selected control;
    wherein at least one of said controls includes a property directing said client processor to execute the following steps in response to a predetermined action:
    (1) direct said switching means to switch to said data mode; and
    (2) direct said modem to transmit data identifying said action; and
    a server station in communication with said client station over said telephone line, said server station having:
    (a) means for audio communications over said telephone line;
    (b) a modem for data communications over said telephone line; and
    (c) a server processor in communication with said modem and including programmed instructions to be executed by said server processor in response to said actions received from said client station, said server processor also including a definition of a form having at least some controls in common with said client station visual form that are updated by said server processor to reflect actions received from said client station.

12. The telecommunication system of claim 11 wherein said means for audio communication for said server station comprise a telephone set for use by a live operator, and wherein said server station further comprises a display controlled by said processor for displaying said server form.

13. The telecommunication system of claim 11 wherein said means for audio communications for said server station comprise a voice card controlled by said processor for transmitting prerecorded audio messages over said telephone line, and wherein said server processor directs said voice card to transmit selected audio messages in response to said actions received from said client station.

14. The telecommunication system of claim 11 wherein said control comprises a field for entry of data.

15. The telecommunication system of claim 14 wherein said control properties comprise instructions for validating data entered in said field.

16. The telecommunication system of claim 11 wherein said control comprises a push button.

17. The telecommunication system of claim 11 wherein said control comprises a list containing a plurality of options that can be selected by said input means.

18. The telecommunication system of claim 11 wherein said control comprises a field displaying specified text.

19. The telecommunication system of claim 11 wherein said control comprises a field displaying a specified image.

20. The telecommunication system of claim 11 wherein said definition of said visual form used by said client station is transmitted by said server station over said telephone line to said client station.

21. A telecommunication system for providing voice and visual data communications via a telephone line comprising:
a client station having:
  (a) a telephone;
  (b) data circuit-terminating equipment (DCE) having:
    (1) a modem for providing data communications over said telephone
    (2) start signal generating means for transmitting a start signal over said telephone line prior to transmission of data by said modem;
    (3) start signal detecting means for detecting said start signal received over said telephone line; and
    (4) switching means for selectively connecting said telephone to said telephone line in a voice mode, and for disconnecting said telephone and connecting said modem to said telephone line in a data mode;
  (c) a client processor controlling said DCE to automatically switch from said voice mode to said data mode when data is being received or transmitted over said telephone line; said client processor also including a definition of a visual form having at least one control with predetermined properties, including properties defining permissible actions that can be taken with respect to each control and instructions to be executed by said client processor in response to said actions;
  (d) a display controlled by said client processor for displaying said visual form; and
  (e) input means in communication with said client processor for selecting a control in said visual form and performing an action on said selected control;
wherein at least one of said controls includes a property causing said client processor to direct said DCE to switch to data mode, transmit data identifying said action, and return to voice mode; and
a server station in communication with said client station over said telephone line, said server station having:
  (a) voice transmitting means for transmitting recorded voice messages over said telephone line;
  (b) a DCE; and
  (c) a server processor controlling said voice transmitting means and said DCE to automatically provide voice and data communications over said telephone line with said client station in accordance with programmed instructions in response to actions received from said client station, said server processor also including a definition of a form having at least some controls in common with said client station visual form that are updated by said server processor to reflect actions received from said client station.

22. The telecommunication system of claim 21 wherein said client station and said server station communicate form definition files as data over said telephone line, each form definition file comprising a series of elements defining controls in said visual form and commands to be executed by the receiving station with regard to said visual form.

23. The telecommunication system of claim 22 wherein said server station transmits a form definition file to said client station to initially define said visual form for said client station.

24. The telecommunication system of claim 22 wherein said client station transmits a form definition file to said server station to reflect actions on said visual form at said client station.

25. The telecommunication system of claim 21 wherein said server station further comprises:
a telephone for audio communication with a live operator; and
a display controlled by said server processor for displaying said server form.

26. A telecommunication system for providing voice and visual data communications between a first station and a second station via a telephone line, wherein each station comprises:
a telephone;
data circuit-terminating equipment (DCE) having:
  (a) a modem for providing data communications over said telephone;
  (b) start signal generating means for transmitting a start signal over said telephone line prior to transmission of data by said modem;
  (c) start signal detecting means for detecting said start signal received over said telephone line; and
  (d) switching means for selectively connecting said telephone to said telephone line in a voice mode, and for disconnecting said telephone and connecting said modem to said telephone line in a data mode;
a processor controlling said DCE to automatically switch from said voice mode to said data mode when data is being received or transmitted over said telephone line; said processor also including a definition of a visual form having at least one control with predetermined properties, including properties defining permissible actions that can be taken with respect to each control;
a display controlled by said processor for displaying said visual form; and
input means in communication with said processor for selecting a control in said visual form and performing an action on said selected control;
wherein each station uses a visual form having at least some controls in common among the visual form of the other station; and wherein both stations communicate data over said telephone line and update said common controls to reflect actions on any of said common controls at the other station.

27. The telecommunication system of claim 26 wherein said stations communicate form definition files as data over said telephone line, each form definition file comprising a series of elements defining controls in said visual form and commands to be executed with regard to said visual form.

28. The telecommunication system of claim 27 wherein said first station transmits a form definition file to said second station to initially define said visual form for said second station.

29. The telecommunication system of claim 27 wherein said second station transmits a form definition file to said first station to reflect actions on said visual form at said second station.

30. A telecommunication system for providing voice and visual data communications between a first station and a second station via a telephone line, wherein each station comprises:

means for audio communications over said telephone line;

data circuit-terminating equipment (DCE) having:
   (a) a modem for providing data communications over said telephone;
   (b) start signal generating means for transmitting a start signal over said telephone line prior to transmission of data by said modem;
   (c) start signal detecting means for detecting said start signal received over said telephone line; and
   (d) switching means for selectively connecting said audio communications means to said telephone line in a voice mode, and for disconnecting said audio communications means and connecting said modem to said telephone line in a data mode;

a display;

a processor controlling said DCE to automatically switch from said voice mode to said data mode when data is being received or transmitted over said telephone line; said processor also including:
   (a) means for controlling said display to display a visual form having at least one control with predetermined properties, including properties defining permissible actions that can be taken with respect to each control; and wherein said visual form has at least some controls in common with the visual form of the other station that are automatically updated to reflect actions on any of said common controls at the other station; and
   (b) means for controlling said DCE to communicate form definition files as data over said telephone line with the other station, said form definition file including a series of elements defining controls in said visual form and commands to be executed with regard to said visual form; and input means in communication with said processor for selecting a control in said visual form and performing an action on said selected control.

31. The telecommunication system of claim 30 wherein said form definition file comprises a command instructing said processor to open a specified visual form.

32. The telecommunication system of claim 30 wherein said form definition file comprises a command instructing said processor to close a specified visual form.

33. The telecommunication system of claim 30 wherein said form definition file comprises data for specified controls in said visual form and said form definition file further comprises a command instructing said processor to merge said specified controls into said visual form.

34. The telecommunication system of claim 30 wherein said form definition file comprises a command instructing said processor to close the current visual form and then open a specified visual form.

35. The telecommunication system of claim 30 wherein said form definition file comprises a command instructing said processor to execute specified steps.

* * * * *